United States Patent
Tip et al.

(10) Patent No.: US 7,137,104 B2
(45) Date of Patent: Nov. 14, 2006

(54) SEMANTICS-BASED COMPOSITION OF CLASS HIERARCHIES

(75) Inventors: Frank Tip, Mount Kisco, NY (US); Gregor Snelting, Passau (DE)

(73) Assignee: International Business Machines Corporation, Armonk, NY (US)

( * ) Notice: Subject to any disclaimer, the term of this patent is extended or adjusted under 35 U.S.C. 154(b) by 721 days.

(21) Appl. No.: 10/153,055

(22) Filed: May 21, 2002

(65) Prior Publication Data

US 2003/0221182 A1 Nov. 27, 2003

(51) Int. Cl.
G06F 9/44 (2006.01)
(52) U.S. Cl. ...... 717/126; 717/116
(58) Field of Classification Search ........ 717/107, 717/108, 116, 165, 131, 143, 154, 124, 126
See application file for complete search history.

(56) References Cited

U.S. PATENT DOCUMENTS

| | | | |
|---|---|---|---|
| 5,546,584 A * | 8/1996 | Lundin et al. | 719/315 |
| 5,615,333 A * | 3/1997 | Juettner et al. | 714/38 |
| 5,983,020 A * | 11/1999 | Sweeney et al. | 717/141 |
| 6,142,684 A * | 11/2000 | Kirshenbaum et al. | 717/143 |
| 6,179,491 B1 * | 1/2001 | Choi et al. | 717/116 |
| 6,230,314 B1 * | 5/2001 | Sweeney et al. | 717/108 |
| 6,275,976 B1 * | 8/2001 | Scandura | 717/120 |
| 6,467,086 B1 * | 10/2002 | Kiczales et al. | 717/165 |
| 6,480,856 B1 * | 11/2002 | McDonald et al. | 707/100 |
| 2004/0015822 A1 * | 1/2004 | Linton et al. | 717/104 |

OTHER PUBLICATIONS

Jang, Yoon Kyu et al. "Change Impact Analysis for a Class Hierarchy," Proceedings of the 1998 Asia Pacific Software Engineering Conference, pp. 304-311, Taipei, Dec. 1998.*

Binkley, David; Horwitz, Susan; and Reps, Thomas. "Program Integration for Languages with Procedure Calls," ACM Transactions on Software Engineering and Methodology, pp. 3-35, Jan. 1995.

Emst, Erik. "Propagating Class and Method Combination," In Proc. European Conference on Object-Oriented Programming (ECOOP99), pp. 67-91, Lisboa, 1999.

Harrison, William and Ossher, Harold. "Subject-Oriented Programming (A Critique of Pure Objects)," In Proceedings of the Conference on Object-Oriented Programming Systems, Languages and Applications, pp. 411-428, 1993.

Kiczales, Gregor; Hilsdale, Erik; Hugunin, Jim; Kersten, Mik; Palm, Jeffrey; and Griswold, William G. "An Overview of AspectJ," In Proc. 15$^{th}$ European Conference on Object-Oriented Programming (ECOOP'01), pp. 327-353, Budapest, Hungary, Jun. 2001.

Wand, Mitchell; Kiczales, Gregor; and Dutchyn, Christopher. "A Semantics for Advice and Dynamic Join Points in Aspect-Oriented Programming," Oct. 2001.

* cited by examiner

*Primary Examiner*—Tuan Dam
*Assistant Examiner*—Michael Yigdall
(74) *Attorney, Agent, or Firm*—Casey P. August; Jon A. Gibbons; Fleit, Kain, Gibbons, Gutman, Bongini & Bianco P.L.

(57) ABSTRACT

A system, method and computer readable medium for providing class hierarchy composition aims at constructing software systems by composing a set of class hierarchies into an executable system. Current composition algorithms cannot provide semantic guarantees. The present invention provides a composition algorithm, together with an interference criterion and its correctness proof, which guarantees that behavior of the original hierarchies is preserved for interference-free compositions. In case of interference, an impact analysis can determine the consequences of integration. The method is based on existing program analysis technology and is illustrated by various examples.

29 Claims, 6 Drawing Sheets

(a)

(b)

```
class Course {
  Course(Professor p, String name){
    prof = p; courseName = name;
    students = new HashSet();
  }
  String toString(){ return courseName; }
  void enroll(Student s){
    if (!students.contains(s)){
      students.add(s);
      s.coursesTaken.add(this); }
  }
  void assign(Professor p){
    prof = p;
    p.coursesGiven.add(this);}
  Set students; Professor prof;
  String courseName;
}
class Person {
  Person(String n, String a){
    name = n; address = a;
  }
  String name; String address; }
class Student extends Person {
  Student(String n, String a){
    super(n, a);
    coursesTaken = new HashSet(); }
  String toString(){
    return "student "+name+" takes "+
        coursesTaken+"\n"; }
  Set coursesTaken;
}
class Professor extends Person {
  Professor(String n, String a){
    super(n, a);
    coursesGiven = new HashSet(); }
  String toString(){
    return "prof. "+name+" teaches "+
        coursesGiven+"\n"; }
  boolean approveGraduation(Student s){
    return approveCourses(s); }
  boolean approveCourses(Student s){
    return true; // details omitted
  }
  Set coursesGiven;
}
class Driver1 {
  void main(){
    Professor p1 =
      new Professor("prof1","padd1"); P1
    Student s1 =
      new Student("stu1","sadd1"); S1
    Course c1 = new Course(p1, "CS121");
    c1.enroll(s1); c1.assign(p1);
    boolean b = p1.approveGraduation(s1);
  }
}
```

$\mathcal{H}_2$

```
class Person { ... } // as in H1
class Student {
  Student(String n, String a){
    . . // as in H1
  }
```

```
  void setAdvisor(Professor p){
    advisor = p; }
  Set coursesTaken; Professor advisor;
}
class Professor {
  Professor(String n, String a){
    ... // as in H1
  }
  void hireAssistant(Student s){
    assistant = s; }
  Set coursesGiven; Student assistant;
}
class Driver2 {
  void main(){
    Professor p2 =
      new Professor("prof2","padd2"); P2
    Student s2 =
      new Student("stu2","sadd2"); S2
    s2.setAdvisor(p2);p2.hireAssistant(s2);
  }
}
```

$\mathcal{H}_3$

```
class Person { . . } // as in H1
class Student {
  Student(String n,String a){
      // as in H1
  }
  Set coursesTaken;
}
class PhDStudent extends Student {
  PhDStudent(String n,String a){
    super(n,a);
  }
}
class Professor {
  Professor(String n,String a){
    . . // as in H1
  }
  boolean approveGraduation(Student s){
    boolean approved = approveCourses(s);
    if (s instanceof PhDStudent){
      approved = approved &&
        approveThesis((PhDStudent)s);
    }
    return approved;
  }
  boolean approveCourses(Student s){
    ... // as in H1
  }
  boolean approveThesis(PhDStudent s){
    /* details omitted */
  }
  Set coursesGiven;
}
class Driver3 {
  void main(){
    Professor p3 =
      new Professor("prof3","padd3"); P3
    PhDStudent s3 =
      new PhDStudent("stu3","sadd3"); S3
    p3.approveGraduation(s3);
  }
}
```

Fig. 1

```
class Course { ··· }                              // as in H₁
class Person { ··· }                              // as in H₁ and H₂
class Student extends Person {
  Student(String n, String a){ ··· }              // as in H₁ and H₂
  String toString(){ ··· }                        // as in H₁
  void setAdvisor(Professor p){ ··· }             // as in H₂
  Set coursesTaken;
  Professor advisor;
}
class Professor extends Person {
  Professor(String n, String a){ ··· }            // as in H₁ and H₂
  String toString(){ ··· }                        // as in H₁
  boolean approveGraduation(Student s){ ··· }     // as in H₁
  boolean approveCourses(Student s){ ··· }        // as in H₁
  void hireAssistant(Student s){ ··· }            // as in H₂
  Set coursesGiven;
  Student assistant;
}
class Driver1 { ··· }                             // as in H₁
class Driver2 { ··· }                             // as in H₂
```

Fig. 2.

```
class Course { ··· }                              // as in H₁
class Person { ··· }                              // as in H₁ and H₃
class Student extends Person {
  Student(String n, String a){ ··· }              // as in H₁ and H₃
  String toString(){ ··· }                        // as in H₁
  Set coursesTaken;
}
class PhDStudent extends Student { ··· }          // as in H₃
class Professor extends Person {
  Professor(String n, String a){ ··· }            // as in H₁ and H₃
  String toString(){ ··· }                        // as in H₁
  boolean approveGraduation(Student s){ ··· }     // as in H₃
  boolean approveCourses(Student s){ ··· }        // as in H₁ and H₃
  boolean approveThesis(PhDStudent s){ ··· }      // as in H₃
  Set coursesGiven;
}
class Driver1 { ··· }                             // as in H₁
class Driver3 { ··· }                             // as in H₃
```

Fig. 3.

```
class A {                    class A {                              class A {
   void foo(){ ··· }            void foo(){ /* same as H₁ */ }         void foo(){ ··· }
}                            }                                      }
class B extends A {          class B extends A {                    class B extends A {
   /* no foo() */               void foo(){ ··· }                      void foo(){ /* from H₂ */ }
}                            }                                      }
class C {                                                           class C {
   static void main(){                                                 static void main(){
      A o = new B();  B1                                                  A o = new B();  B1
      o.foo();                                                            o.foo();
   }                                                                  }
}                                                                   }
         H₁                            H₂                                    H₁ ⊕ H₂
```

```
class A {                       class A {                    class A {
    static A x;                     void foo(){                  static A x;
    void foo(){ x = new A(); } [A1]    x = new B(); [B2]         void foo(){
    void bar(){  ·  }               }                                x = new B(); [B2]
}                               }                                }
class B extends A {                                              void bar(){ ··· }
    void bar(){ · · }                                         }
}                                                             class B extends A {
class C {                                                         void bar(){ ··· }
    static void main(){                                       }
        A a = new B(); [B1]                                   class C {
        a.foo(); A.x.bar();                                       static void main(){
    }                                                                 A a = new B(); [B1]
}                                                                     a.foo(); A.x.bar();
                                                                  }
                                                              }

$\mathcal{H}_1$              $\mathcal{H}_2$              $\mathcal{H}_1 \oplus \mathcal{H}_2$
```

Fig. 6.

$$AffectedTests(\mathcal{T}, \mathcal{A}) = \{ t_i \mid t_i \in \mathcal{T},\ Nodes(P, t_i) \cap (CM \cup DM)) \neq \emptyset \} \cup$$
$$\{ t_i \mid t_i \in \mathcal{T},\ n \in Nodes(P, t_i),\ n \to_B A.m \in Edges(P, t_i),$$
$$\langle B, X.m() \rangle \in LC,\ B <^* A \leq^* X \}$$

Fig. 7.

SEMANTICS-BASED COMPOSITION OF CLASS HIERARCHIES

BACKGROUND OF THE INVENTION

1. Field of the Invention

This invention generally relates to the field of object-oriented programming and class hierarchies and more specifically to constructing software systems by composing the code associated with a set of class hierarchies into an executable system.

2. Description of Related Art

Class hierarchy composition aims at constructing software systems by composing the code associated with a set of class hierarchies into an executable system, or by weaving separately written aspects into a class hierarchy. See generally William Harrison and Harold Ossher, "Subject-Oriented Programming (A Critique Of Pure Objects)" In Proceedings of the Conference on Object-Oriented Programming Systems, Languages, and Applications, pages 411–428, 1993 and Gregor Kiczales, Erik Hilsdale, Jim Hugunin, Mik Kersten, Jeffrey Palm, and William G. Griswold. An overview of AspectJ, In Proc. 15th European Conf. on Object-Oriented Programming (ECOOP'01), Budapest, Hungary, June 2001. Advocates of composition argue that, by putting the functionality associated with each system feature in a separate hierarchy, a better separation of concerns is achieved, resulting in code that is easier to understand, maintain, and change.

Although considerable amounts of work have been devoted to developing specification formalisms for software composition, and on the methodological aspects of compositional software development, current techniques and tools for hierarchy composition operate on a purely syntactical basis and cannot provide any semantic guarantees about the behavior of the composed hierarchy. It is thus our aim to develop a semantically well-founded notion of composition that enables reasoning about the behavior of composed class hierarchies. Accordingly a need exists to overcome the shortcomings of the prior art systems and to provide a semantically well-founded notion of composition that enables reasoning about the behavior of composed class hierarchies.

Research on aspect-oriented software development has been gaining in popularity recently see for example Communications of the ACM. 44(10), October 2001, "Special Issue On Aspect-Oriented Programming." In essence, the goal of this field is to obtain more extensible and reusable designs by distributing unrelated functionality over disjoint hierarchies or aspects. To achieve this, a mechanism for composing these functionalities into executable code is needed. In our setting, this is accomplished by composing hierarchies. Aspect-oriented languages such as AspectJ (see Gregor Kiczales, Erik Hilsdale, Jim Hugunin, Mik Kersten, Jeffrey Palm, and William G. Griswold, "An overview of AspectJ", In Proc. 15th European Conf. on Object-Oriented Programming (ECOOP'01), Budapest, Hungary, June 2001) have language constructs that allow one to specify the conditions under which a piece of advice is "woven in" at a joint point. Until recently, there has been very little work on the semanticfoundations of composition The work most closely related to ours is the Aspect Sandbox (ASB) project by Wand et al. (see Mitchell Wand, Gregor Kiczales, and Christopher Dutchyn, "A Semantics For Advice And Dynamic Join Points In Aspect-Oriented Programming", October 2001), who incorporate several key aspect-oriented language constructs such as join points, pointcut designators, and advice into a simple language with procedures, classes, and objects. Wand et al. formalize the semantics of this language using a denotational semantics. Wand et al. do not provide any guarantees about the non-interference of aspects, nor do they determine the semantic impact of "weaving in" an aspect.

Ernst presented a class hierarchy composition system, where the composition operator is built into the syntax of the programming language gbeta. Explicitly specified compositions may trigger propagation of implicit compositions, for example an explicit combination of methods or classes may trigger implicit composition of other (e.g. auxiliary) methods or classes. Ernst showed that his composition system and propagation mechanism preserve static type correctness, but nothing is said about preservation of dynamic client behavior.

Our approach is similar in spirit to the work by Binkley et al. (see David Binkley, Susan Horwitz, and Thomas Reps "Program Integration For Languages With Procedure Calls", ACM Transactions on Software Engineering and Methodology, pages 3–35, January 1995.) on the integration of C programs that are variations of a common base, by analyzing and merging their program dependence graphs. Similar to our work, Binkley et al. use an interference test, which is a sufficient criterion for noninterference. The main differences between Binkley et al. and our work is that Binkley et al. operates at the statement level, whereas our techniques operate on calling relationships between methods. Binkley et al. do not consider object-oriented language features.

Composition of object-oriented programs has been studied by other authors in the context of component-based systems. See Oscar Nierstrasz and Dennis Tsichritzis (ed.). "Object-Oriented Software Composition", Prentice Hall, 1995. One approach is concerned with the dynamic interaction of concurrent objects, and the goal is to create new behavior as a composition of given behavior. Our approach aims to preserve old behavior while combining given behavior. Another line of research has investigated the composition of systems from components, where the components are treated as black boxes and come with some interface specification, usually in the form of a type system.

SUMMARY OF THE INVENTION

Briefly, in accordance with the present invention, disclosed is a system, method and computer readable medium for providing class hierarchy composition aims at constructing software systems by composing a set of class hierarchies into an executable system. Current composition algorithms cannot provide semantic guarantees. The present invention provides a composition algorithm, together with an interference criterion and its correctness proof, which guarantees that behavior of the original hierarchies is preserved for interference-free compositions. In case of interference, an impact analysis can determine the consequences of integration. The method is based on existing program analysis technology and is illustrated by various examples.

In one embodiment, a method is directed to composing two or more class hierarchies $\mathcal{H}_1$ and $\mathcal{H}_2$ with associated applications $A_1$ and $A_2$ respectively, resulting in at least one composed class hierarchy $\mathcal{H}_3$, and reporting a behavior of application $A_1$ and application $A_2$ when executing against $\mathcal{H}_3$, the method comprising:

creating a well-defined class in a composed hierarchy $\mathcal{H}_3$ by analyzing a hierarchy $\mathcal{H}_1$ and a hierarchy $\mathcal{H}_2$;

creating the well-defined methods and/or fields in the classes of the hierarchy $\mathcal{H}_3$ by analyzing the hierarchy $\mathcal{H}_1$ and the hierarchy $\mathcal{H}_2$ and user-supplied information;

determining at least one of the following:

if the behavior $A_1$ when executed against a composed hierarchy $\mathcal{H}_3$ differs from the behavior of $A_1$ when executed against $\mathcal{H}_1$ using program analysis; and if the behavior $A_2$ when executed against a composed hierarchy $\mathcal{H}_3$ differs from the behavior of $A_2$ when executed against $\mathcal{H}_2$ using program analysis.

BRIEF DESCRIPTION OF THE DRAWINGS

The subject matter which is regarded as the invention is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

FIG. 1 is example hierarchies concerned with different aspects of university life with the allocation sites are labeled (shown in boxes), according to the present invention.

FIG. 2 is a basic composition: $\mathcal{H}_1 \oplus \mathcal{H}_2$, according to the present invention.

FIG. 3 is an overriding composition: $\mathcal{H}_1 \oplus \mathcal{H}_3$, according to the present invention.

FIG. 6 is a Dynamic interference in an overriding composition.

FIG. 7 is a Definition of AffectedTests.

DESCRIPTION OF THE PREFERRED EMBODIMENTS

Figures 4, 5:
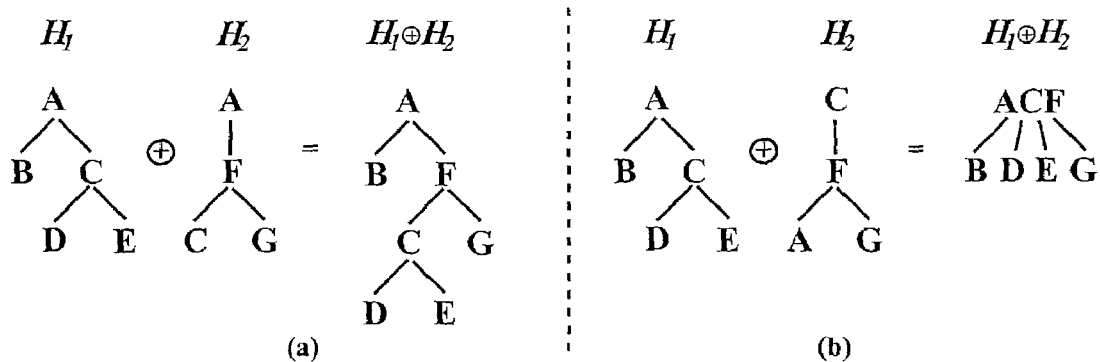
FIG. 4 is a hierarchy composition without class merging (a) with class merging (b), according to the present invention.
FIG. 5 is a Dynamic interference in a basic composition.

It should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality. In the drawing like numerals refer to like parts through several views.

This patent is based in part on a paper entitled "Semantic-Based Composition of Class Hierarchies" with identical named authors, which will be presented on Jun. 10–14, 2002, at the ECOOP (European Conference On Object-Oriented Programming) in Málaga, Spain which is hereinto incorporated by reference in its entirety.

1 Introduction

Class hierarchy composition aims at constructing software systems by composing the code associated with a set of class hierarchies into an executable system, or by weaving separately written aspects into a class hierarchy. The present invention provides the following approach:

The present invention define notions of static interference and dynamic interference that capture how features in one hierarchy may impact the behavior of code in another. The former notion captures behavioral impact at composition-time, whereas the latter is concerned with run-time changes in program behavior.

The present invention considers two kinds of compositions. Basic compositions involve hierarchies that do not statically interfere. Overriding compositions rely on a mechanism by which a user can explicitly resolve static interference.

In cases where interference is found, an impact analysis (similar Barbara G. Ryder and Frank Tip, change impact analysis for object-oriented programs. In Proceedings of the ACM SIGPLAN-SIGSOFT Workshop on Program Analysis for Software Tools and Engineering (PASTE'01), pages 46–53, Snowbird, Utah, June 2001) is performed that determines a set of methods in the composed hierarchy for which preservation of behavior cannot be guaranteed.

Hence, the present invention permits a developer to quickly determine if a proposed composition may result in behavioral changes, and-if so-report precisely which parts of the program may be affected. It should be understood that these techniques can be incorporate t in a system such as Hyper/J in the form of a tool that performs various sanity checks on compositions.

Turning now to FIG. 1 shows three hierarchies that model a number of aspects of university life. $\mathcal{H}_1$ defines classes Course, Person, Student, and Professor, and provides functionality for enrolling students in courses, for associating professors with courses, and for professors to approve the graduation of students (method Professor.approveGraduation ( )). This latter operation requires the approval of the courses taken by a student, modeled using a method approveCourses( ). The details of approveCourses ( ), but one can easily imagine adding functionality for keeping track of a student's course load and grades which would be checked by the professor to base his decision on. Class Driver1 contains a small test driver that exercises the functionality of hierarchy $\mathcal{H}_1$.

Hierarchy $\mathcal{H}_2$ is concerned with employment and advisory relationships. A student can designate a professor as his/her advisor (method Student.setAdvisor( )), and a professor can hire a student as a teaching assistant using method Professor.hireAssistant( ). Class Driver2 exercises the functionality in this hierarchy.

Hierarchy $\mathcal{H}_3$ shows a slightly more elaborate model, where a distinction is made between (undergraduate) Students and PhDStudents. This impacts the approval of graduations, because PhDStudents are also required to produce a thesis of sufficient quality (modeled by method Professor.approvePhDThesis ( )). The details of this method are omitted but are understood by those of average skill in the art.

Let us now consider the composition of $\mathcal{H}_1$ and $\mathcal{H}_2$. These hierarchies are not disjoint, since they contain the same classes. However, since there are no "syntactic collisions" between members in $\mathcal{H}_1$ and $\mathcal{H}_2$ (i.e., $\mathcal{H}_1$ and $\mathcal{H}_2$ do not contain methods with the same name and signatures (i.e., arguments of methods), but with different bodies), one can simply construct a hierarchy that contains the union of the classes in $\mathcal{H}_1$ and $\mathcal{H}_2$, where each class in the combined hierarchy contains the union of the methods/fields that occur in the corresponding class(es) in $\mathcal{H}_1$ and $\mathcal{H}_2$. The resulting hierarchy is shown in FIG. 2.

What can be said about the behavior of $\mathcal{H}_1 \oplus \mathcal{H}_2$? In this case, our interference check guarantees that the behavior of the client applications of these hierarchies (modeled by Driver1.main ( ) and Driver2.main ( )) are unaffected by the composition. For this specific composition, we can even provide the stronger guarantee that the behavior of any client of $\mathcal{H}_1$ and $\mathcal{H}_2$ is preserved. As shown below, this is not always the case.

Now consider composing $\mathcal{H}_1$ and $\mathcal{H}_3$, which contain different methods Professor.approveGraduation ( ), an example of static interference. Method approveGraduation ( ) in $\mathcal{H}_3$ is "more general" than approveGraduation ( ) in $\mathcal{H}_1$. In constructing $\mathcal{H}_1 \oplus H3$ (see FIG. 3), we have assumed that the user specified that the definition of approveGraduation ( ) in $\mathcal{H}_3$ should be preferred over that in $\mathcal{H}_1$. In this case, our techniques report dynamic interference, i.e., preservation of behavior for clients of the original hierarchies cannot be guaranteed. Impact analysis reports that Driver3.main ( ) is not affected by the composition, but that the behavior of Driver1.main ( ) may have changed.

Composition of Hierarchies

One of the first issues that arise when composing two class hierarchies is the question in which classes and methods in the input hierarchies correspond. The Hyper/J composition system (see Peri Tarr, Harold Ossher, William Harrison, and Stanley M. Sutton, Jr. "N Degrees Of Separation: Multi-Dimensional Separation Of Concerns", In Proceedings of the 1999 International Conference on Software Engineering, pages 107–119, May 1999) relies on a specification language to express these correspondences. For example, one can specify "merge-by-name" compositions in which two classes in different input hierarchies are matched if they have the same name, and one can explicitly specify pairs of matching classes (with different names) using an "equate" construct. In order to simplify the presentation in this present invention, we will assume that classes are matched "by name" only. Compositions that are not name-based can be modeled using an additional preprocessing step in which classes and methods are renamed appropriately. In particular, manually established relations between entities in the two hierarchies are assumed to be modeled by appropriate renaming.

Class Hierarchies

Definition 1 defines the notion of a class hierarchy. To keep our definitions simple, we assume that fields and abstract methods have undefined bodies (body (m)=⊥), and that fields and abstract methods cannot have the same name.

Definition 1 (class hierarchy). A class hierarchy $\mathcal{H}$ is a set of classes together with an inheritance relation: $\mathcal{H}=(C, \leq)$. For a class $C \in C$ we also write $C \in \mathcal{H}$. A class $C \in \mathcal{H}$ has a name and contains a set of members (according to this definition, members (C) does not contain inherited members that are declared in superclasses of C):C=(n, M), where name(C)=n, members(C)=M. A member m ∈ members(C) is characterized by its name, its signature and its body: m=(f, σ, B) where σ∈C*×C, where f is the name of the function, σ is the signatures of the function, and B is the body of the function. We will use namesig(m) to denote the combination $<f, \sigma>$ that together uniquely identify a member within a class, and body(m) to denote the body B of member m.

Classes and Inheritance Relations in the Composed Hierarchy

Semantically sound composition requires that the original inheritance relations can be order-embedded into the composed hierarchy. That is, a relationship A instanceof B that holds in an input hierarchy should also hold in the composed hierarchy. In general, one cannot simply compute the union of the inheritance relations in the input hierarchies because the resulting hierarchy may contain cycles. We therefore use a well-known factorization technique that produces an acyclic hierarchy such as those taught by 4. B. A. Davey and H. A. Priestley. Entitled *Introduction to Lattices and Order*. Cambridge University Press 1990. This construction has the advantage that hierarchies can be composed even if there are cycles in the union of the original inheritance relations, which might sometimes be useful in practice.

Given two input hierarchies $\mathcal{H}_1$ and $\mathcal{H}_2$, their composition is denoted $\mathcal{H}_1 \oplus \mathcal{H}_2$. The construction of $\mathcal{H}_1 \oplus \mathcal{H}_2$ is given in Definition 2. This involves: creating a set of pairs of the form <class, hierarchy> (step 1), determining the "union" of the inheritance relations in the input hierarchies (assuming that classes are matched by name) (step 2), determining cycles in the transitive closure of these inheritance relations, and constructing a set of equivalence classes ε corresponding to these cycles (steps 3–5), creation of a class in the composed hierarchy for each equivalence class in ε (step 6), associating a name and a set of members (step 7) with each class, and creation of the inheritance relations in the composed hierarchy (step 8). The term "class" as in "equivalence class" is different form "class" as in "class hierarchy"; we use this "overloading" in order to be compatible with both mathematical and computer science conventions.

Definition 2 (hierarchy composition). Let $\mathcal{H}_1=(C_1, \leq_1)$ and $\mathcal{H}_2=(C_2, \leq_2)$ be two class hierarchies. Then, $\mathcal{H}_1 \oplus \mathcal{H}_2=(C, \leq)$, which is defined as follows:

1. $S=\{<C_1, \mathcal{H}_1>|C_1 \in C_1\} \cup \{<C2, \mathcal{H}2>|C_2 \in C_2\}$,
2. $<C_1, \mathcal{H}_1>\leq'<C_2, \mathcal{H}_1>' \Longleftarrow C_1 \leq C_2$, $<C_1, \mathcal{H}_2>\leq'<C_2, \mathcal{H}_2>\Longleftarrow C_1 \leq_2 C_2$, $<C_1, \mathcal{H}i>\leq'<C_2, \mathcal{H}j>\Longleftrightarrow$ namesig$(C_1)$= namesig$(C_2)$, (i, j∈{1, 2})
3. $x \rho y \Longleftrightarrow x \leq'^* y \wedge y \leq'^* x$,
4. $\leq = \leq'^*/\rho$,
5. $\epsilon = \{[x]_\rho | x \in S\}$,
6. $C = \{\text{class}([x]_\rho)|[x]_\rho \in \epsilon\}$,
7. class$([x]_\rho)$=<namesig$([x]_\rho)$, members $([x]_\rho)>$, and
8. class$([x]_\rho) \leq$ class$([y]_\rho) \Longleftrightarrow [x]_\rho \leq [y]_\rho$ The name function determines the name of the composed class from the names of the classes in equivalence class $[C]_\rho$ and will not be formally defined here (some examples will be given below). Note that the members of a composed class do not include inherited members from the original classes, but only members defined locally in the original classes. Different members operators will be presented for different kinds of compositions in Definitions 4 and 6 below.

Note that $\leq'$ is not necessarily transitive, hence the use of the closure operator. As usual, $[x]_\rho$ consists of all classes ρ-equivalent to x, and $[x]_\rho \leq [y]_\rho \Longleftrightarrow x \leq'y$; we assume that $\leq$ is the smallest partial order satisfying the conditions from the definition. We will use ε to denote the set of all equivalence classes $[<C, \mathcal{H}>]_\rho$, for any $<(C, \mathcal{H}>\in S$. Moreover, we define a partial order on ε by: $<C, \mathcal{H}>\leq'<C'$, $\mathcal{H}'>\Longleftrightarrow [<C, \mathcal{H}>]_\rho \leq [C', \mathcal{H}']_\rho$. Intuitively, one can imagine this order as the directed acyclic graph of all strongly connected components of the union of the two input hierarchies.

EXAMPLE 1

In the hierarchy of FIG. 4(a), the transitive closure of $\leq_1$ and $\leq_2$ does not contain any cycles. Hence, we have: $E=\{\{<A, \mathcal{H}_1>, <A, \mathcal{H}_2,>\}, \{<B, \mathcal{H}_1>\}, \{<C, \mathcal{H}_1>, <C, \mathcal{H}_2>\}, \{<D, \mathcal{H}_1>\}, \{<E, \mathcal{H}_1>\}, \{<F, \mathcal{H}_2,>\}, \{<G, \mathcal{H}_2>\}\}$. Consequently, the following inheritance relations are constructed: B<A, F<A, C<F, G<F, D<C, E<C. Here, class names in the composed hierarchy are generated from the names of the classes in the corresponding equivalence sets (e.g., class A corresponds to $\{<A, \mathcal{H}_1>, <A, \mathcal{H}_2>\}$). Note that immediate subclass/superclass relations need not be preserved F is now between A and C.

EXAMPLE 2

For the slightly more interesting example of FIG. 4(b), we have: $\epsilon=\{\{<A, \mathcal{H}_1>, <A, \mathcal{H}_2>, <C, \mathcal{H}_1>, <C, \mathcal{H}_2>, <F, \mathcal{H}_2>\}, \{<B, \mathcal{H}_1>\}, \{<D, \mathcal{H}_1>\}, \{<E, \mathcal{H}_1>\}, \{<G, \mathcal{H}_2>\}\}$. The composed hierarchy contains a class for each of these equivalence classes (for the purposes of this example, we assume that the name function constructs a class name by concatenating the names of elements in the equivalence class). There is an inheritance relation X<Y if the equivalence class corresponding to X contains a class x, and the equivalence class corresponding to Y contains a class y such that x inherits from y in one or both of the input hierarchies. For example, class B inherits from ACF because $<B, \mathcal{H}_1>$ is part of equivalence class $\{<B, \mathcal{H}_1>\}$, $<A, \mathcal{H}_1>$ is part of equivalence class $\{<A, \mathcal{H}_1>, <A, \mathcal{H}_2>, <C, \mathcal{H}_1>, <C, \mathcal{H}_2>, <F, \mathcal{H}_2>\}$, and class B inherits from class A in $\mathcal{H}_1$. Again, immediate subclass/superclass relations need not be preserved: some immediate relations (e.g., F<C) have been collapsed.

In case classes have been merged, new class names have been introduced as well (e.g. ACF in the above example). Thus any client code must be transferred accordingly: any occurrence of the old class name x must be replaced by name($[x]_\rho$). In the example, any occurrence of class names A, C, or F in client code must be replaced by ACF.

A final issue to note is that the composed inheritance relation may contain multiple inheritance. This may cause problems in languages such as Java that do not support general multiple inheritance. We consider this issue to be outside the scope of this present invention, and plan to pursue an approach in which multiple inheritance is automatically transformed into delegation.

Basic Composition

In defining the set of members in the composed hierarchy, the question arises of what to do when two or more classes in an equivalence class $[x]_\rho$ define the same member. We will refer to such cases as static interference. The easiest approach of dealing with this issue is to simply disallow composition if static interference occurs. We will refer to this scenario as basic composition. As we shall see shortly, the absence of static interference does not guarantee preservation of behavior.

Definition 3 defines basic static interference. Note that it does allow situations where an equivalence class $[x]_\rho$ contains two elements $<C_1, \mathcal{H}_1>$ and $<C_1, \mathcal{H}_2>$ such that $C_1$ and $C_2$ each contain a member m, provided that (i) body(m)=$\perp$ holds for at least one of these m's, or (ii) that the two m's have the same body.

Definition 3 (basic static interference). $\epsilon$ contains basic static interference if there is an equivalence class $[x]_\rho \in E$ such that for some $<C_1, \mathcal{H}>$, $<C_2, \mathcal{H}'> \in [x]_\rho$, $C_1 \neq C_2$, $m_1 \in$ members $(C_1)$, $m_2 \in$ members $(C_2)$, namesig($m_1$) =namesig ($m_2$) we have that: body($m_1$)$\neq \perp$, body($m_2$)$\neq \perp$, and body($m_1$)$\neq$body($m_2$).

Definition 4 defines the set of members in the composed hierarchy. Note that, in cases where the classes in an equivalence class contain multiple methods with the same name and signature, the unique method with a non-$\perp$ body is selected.

Definition 4 (members). Let E be free of basic static interference, and let $[x]_\rho \in \epsilon$ be an equivalence class. Define:

members $([x]_\rho)=\{m|<C, \mathcal{H}>\in[x]_\rho$, $m\in$members (C), ($<C'$, $\mathcal{H}'>\in[x]_\rho$, $C' \neq C$, $m'\in$members (C'), namesig(m)=namesig(m')$\Longrightarrow$body(m')=$\perp$,$\}$

EXAMPLE 3

The transitive closure of the inheritance relations in $\mathcal{H}_1$ and $\mathcal{H}_2$ of FIG. 1 does not contain any cycles. Hence, the construction of Definition 2 produces a hierarchy with classes Course, Person, Student, Professor, Driver1, and Driver2, with inheritance relations Student<Person and Professor<Person. The equivalence classes constructed are: $S_1=\{<$Course, $\mathcal{H}_1>\}$, $S_2=\{<$Person, $\mathcal{H}_1>\}$, $S_3=\{<$Student, $\mathcal{H}_1>$, $<$Student, $\mathcal{H}_2>\}$, $S_4=\{<$Professor, $\mathcal{H}_1>$, $<$(Professor, $\mathcal{H}_2>\}$, $S_5=\{<$Driver1, $\mathcal{H}_1>\}$, and $S_6=\{<$Driver2, $\mathcal{H}_2>\}$. Definition 3 states that there is basic static interference if an equivalence class S contains multiple methods with the same name but different bodies. Singleton equivalence classes such as $S_1$, $S_2$, $S_5$, and $S_6$ cannot give rise to interference because a class can contain only one method with a given name and signature. $S_3$ and $S_4$ do not give rise to interference either because Student and Professor in $\mathcal{H}_1$ and $\mathcal{H}_2$ do not contain conflicting methods. Hence, there is no basic static interference. FIG. 2 shows the composed hierarchy.

EXAMPLE 4

Consider composing the class hierarchies $\mathcal{H}_1$ and $\mathcal{H}_3$ of FIG. 1. The set equivalence classes $\epsilon$ constructed according to Definition 2 contains, among others, the element S=$\{<$Professor, $\mathcal{H}_1>$, $<$Professor, $\mathcal{H}_3>\}$. $\epsilon$ exhibits basic static interference because both elements of S contain a member Professor.approveGraduation(Student) and the bodies of these methods are different. Hence, basic composition cannot be applied to $\mathcal{H}_1$ and $\mathcal{H}_3$.

Overriding Composition

As shown in FIG. 3, basic static interference is not necessarily an unwanted phenomenon. Often, a method from $\mathcal{H}_2$ is an "improved" or "generalized" version of a method in $\mathcal{H}_1$. To address such cases, we augment basic composition with a mechanism that allows one to express conditions such as "member B.m in $\mathcal{H}$ has precedence over member A.m in $\mathcal{H}$". This is captured by a precedence relation << containing elements $<\mathcal{H}, m_1><<<\mathcal{H}', m_2>$ indicating that method $m_2$ of hierarchy $\mathcal{H}'$ has precedence over method $m_1$ of hierarchy $\mathcal{H}$. Note that it may be the case that $\mathcal{H}_,=\mathcal{H}'$. It is assumed that '<<' is a partial order.

The static interference notion of Definition 3 only requires minor modifications to allow situations where an equivalence class contains two classes $C_1$ and $C_2$ originating from hierarchies $\mathcal{H}_1$ and $\mathcal{H}_2$, respectively, such that $<\mathcal{H}_1, m_1>$ and $<\mathcal{H}_2, m_2>$ are $<<$-ordered. Definition 5 shows the resulting definition.

Definition 5 (overriding static interference). $\epsilon$ contains overriding static interference w.r.t. '<<' if there is an equivalence class $[x]_\rho \in \epsilon$ such that for some $<C_1, \mathcal{H}>$, $<C_2, \mathcal{H}> \in [x]_\rho$, $C_1 \neq C_2$, $m_1 \in \text{members}(C_1)$, $m_2 \in \text{members}(C_2)$, and $\text{namesig}(m_1) = \text{namesig}(m_2)$ we have that: $\text{body}(m_1) \neq \bot$, $\text{body}(m_2) \neq \bot$, $\text{body}(m_1) \neq \text{body}(m_2)$, $(\mathcal{H}, m_1) \not<< <\mathcal{H}', m_2>$, and $<\mathcal{H}', m_2> \not<< <\mathcal{H}, m_1>$.

Definition 6 shows the members function for overriding compositions. In the sequel, we will often say "$\mathcal{H} \oplus \mathcal{H}_2$ is free of overriding syntactic interference" if it is obvious which ordering '<<' is used.

Definition 6 (members). Let $\epsilon$ be free of overriding static interference w.r.t '<<', and let $[x]_\rho \in \epsilon$ be an equivalence class. Define:

members $([x]_\rho) = \{m_1 | <C_1, \mathcal{H}_1> \in [x]_\rho, m_1 \in \text{members}(C_1), (<C_2, \mathcal{H}_2> \in [x]_{\rho 2}, C_2 \neq C_1, m_1 \in \text{members}(C_2), \text{namesig}(m_1) = \text{namesig}(m_2)) \Rightarrow \text{body}(m_2) = \bot \vee <\mathcal{H}_1, m_1> <<< <\mathcal{H}_2, m_2>\}$

EXAMPLE 5

Consider an overriding composition of hierarchies $\mathcal{H}_1$ and $\mathcal{H}_3$ of FIG. 1 using <Professor.approveGraduation (Student), $\mathcal{H}_1$> <<< <Professor.approveGraduation (Student), $\mathcal{H}_3$>. Then, the set of equivalence classes $\epsilon$ constructed by Definition 2 is: $S_1 = \{<\text{Course}, \mathcal{H}_1>\}$, $S_2 = \{<\text{Person}, \mathcal{H}_1>\}$, $S_3 = \{<\text{Student}, \mathcal{H}_1>\}$, $S_4 = \{(\text{Professor}, \mathcal{H}_1>, <\text{Professor}, \mathcal{H}_3>\}$, $S_5 = \{<\text{Driver1}, \mathcal{H}_1>\}$, $S_6 = \{<\text{PhDStudent}, \mathcal{H}_3>\}$, and $S_7 = \{<\text{Driver3}, \mathcal{H}_3>\}$. Since singleton sets never give rise to interference, we only need to verify that $S_4$ does not cause overriding static interference. This is the case because the only method that occurs in both Professor classes is approveGraduation( ), and these methods are <<-ordered. The composed hierarchy can now be constructed using Definition 6, and was shown earlier in FIG. 3.

Type Correctness

A class hierarchy is type correct if: (1) any member access e.m( . . . ) refers to a declared member definition, and (2) for any assignment x=y, the type of x is a superclass of the type of y. As a first step towards providing semantic guarantees about the composed class hierarchy, we demonstrate that the composed hierarchy is type correct. Due to space limitations, we only demonstrate these properties for basic compositions. The arguments for overriding compositions are similar.

Definition 7 (type correctness). Let $\mathcal{H}$ be a hierarchy.
1. The static type of an object or object reference in a hierarchy is denoted TypeOf($\mathcal{H}$, o), where o is a declare type variable. For convenience, we use TypeOf($\mathcal{H}_{1,2}$, o)=C as an abbreviation for TypeOf($\mathcal{H}_1$, o)=C $\vee$ TypeOf($\mathcal{H}_2$, o)=C.
2. For a class $C \in \mathcal{H}$ and $m \in \text{members}(C)$, we define StaticLookup($\mathcal{H}$, C, m)=m', where m'$\in$members (C') for some class C' such that $C \leq C'$, namesig(m)= namesig(m), and there is no class C" such that $C \leq C" \leq C'$, m"$\in$members (C"), namesig(m)=namesig (m"). We will use Static Lookup($\mathcal{H}_{1,2}$, C, m)=m' as a shorthand for StaticLookup($\mathcal{H}_1$, C,m)=m' $\vee$ StaticLookup($\mathcal{H}_2$,C,m)=m'
3. A hierarchy $\mathcal{H}$ is type correct if for all assignments x=y$\in\mathcal{H}$ we have that TypeOf($\mathcal{H}$, x)$\geq$TypeOf($\mathcal{H}$, y), and for all member accesses o.m( . . . )$\in\mathcal{H}$ we have that: StaticLookup($\mathcal{H}$, TypeOf ($\mathcal{H}$, o), m)$\neq\bot$.

Note that if TypeOf($\mathcal{H}_{1,2}$, o)=C, then by construction TypeOf($\mathcal{H}_1 \oplus \mathcal{H}_2$, o) =class($[C]_\rho$). As an example, consider FIG. 4, and assume that v is a variable such that TypeOf($\mathcal{H}_1$, v)=A. Then, in FIG. 4(a) we have that TypeOf ($\mathcal{H}_1 \oplus \mathcal{H}_2$, v)=A and in FIG. 4(b) that TypeOf($\mathcal{H}_1 \oplus \mathcal{H}_2$, v)=ACF. The latter case demonstrates that sometimes new class names are introduced, and member declarations must be changed accordingly. In particular, whenever name($[C]_\rho$)$\neq$name(C), all declarations containing class name C must be updated to reflect the new class name name($[C]_\rho$). This will only happen if classes have been merged due to cycles in the transitive inheritance relations of the input hierarchies.

The following two lemmas show that assignments and member lookups in the composed hierarchy remain type correct. Note that this includes assignments due to parameter-passing in method calls, and implicit assignments to this-pointers.

Lemma 1 (assignment correctness). Let x=y be an assignment in $\mathcal{H}_{1,2}$. Then, this assignment is still type correct in $\mathcal{H}_1 \oplus \mathcal{H}_2$.

Proof. Without loss of generality, let x=y $\in \mathcal{H}_1$. Then, TypeOf ($\mathcal{H}_1$, x)$\geq_1$TypeOf($\mathcal{H}_1$, y). By construction, TypeOf($\mathcal{H}_1 \oplus \mathcal{H}_2$, x)=class([TypeOf ($\mathcal{H}_1$, x)]$_\rho$)$\geq$class([TypeOf ($\mathcal{H}_1$, y)]$_\rho$)=TypeOf($\mathcal{H}_1 \oplus \mathcal{H}_2$, y).

Lemma 2 (member access correctness). If $\mathcal{H}_1$ and $\mathcal{H}_2$ are type correct and with-out basic static interference, then StaticLookup($\mathcal{H}_{1,2}$, TypeOf($\mathcal{H}_{1,2}$, o), m), $\neq\bot \Rightarrow$ StaticLookup($\mathcal{H}_1 \oplus \mathcal{H}_2$, TypeOf($\mathcal{H}_1 \oplus \mathcal{H}_2$, o), m)$\neq\bot$ Proof. Without loss of generality, let C=TypeOf($\mathcal{H}_1$, o), and let D be the class which contains m'=StaticLookup($\mathcal{H}_1$, TypeOf($\mathcal{H}_1$, o), m) . Then, we have $C \leq_1 D$, m$\in$members(D) and by construction m$\in$members(class($[D]_\rho$)) as there is no static interference. Furthermore, class($[C]_\rho$)$\leq$class($[D]_\rho$) and TypeOf($\mathcal{H}_1 \oplus \mathcal{H}_2$, o)=class($[C]_\rho$). m could also occur in a subclass of class($[D]_\rho$) in $\mathcal{H}_1 \oplus \mathcal{H}_2$, but for class D' which contains m"=StaticLookup($\mathcal{H}_1 \oplus \mathcal{H}_2$, TypeOf($\mathcal{H}_1 \oplus \mathcal{H}_2$, o), m), we have in any case that D'$\leq$class ($[D]_\rho$), hence StaticLookup($\mathcal{H}_1 \oplus \mathcal{H}_2$, TypeOf ($\mathcal{H}_1 \oplus \mathcal{H}_2$, o), m)$\neq\bot$.

Corollary 1. For hierarchies $\mathcal{H}_1$ and $\mathcal{H}_2$ without static interference, $\mathcal{H}_1 \oplus \mathcal{H}_2$ is type correct.

Dynamic Interference

MOTIVATING EXAMPLES

Even basic composition (which makes the strongest assumptions about static noninterference) does not guarantee preservation of client behavior. This can be seen in the basic composition of FIG. 5, which does not exhibit static interference.

However, $H_1 \oplus H_2$ contains an overriding definition of foo( ) in class B, hence the call to foo( ) in C. main( ) binds to B.foo( ) instead of A.foo( ) as it did in $\mathcal{H}_1$. Hence, behavior of $\mathcal{H}_1$'s client C.main( ) is not preserved.

FIG. 6 shows an overriding composition (constructed using <$\mathcal{H}_1$, A.foo( )><<<$\mathcal{H}_2$, A. foo( )>) that is free of overriding static interference. However, in the composed hierarchy, variable x is bound to a B-object instead of an A-object. Thus, the call x.bar( ) suddenly resolves to B.bar( ) instead of A.bar( ) as in $\mathcal{H}_1$.

Dynamic Interference

The term dynamic interference is used to refer to run-time behavioral changes such as the ones in the above examples. Some additional definitions are required to make this notion precise. To this end, we will use an operational semantics, where the effect of statement execution is described as a state transformation.

Definition 8 (state, state transformation).
1. A program state maps variables to values: $\sigma \in \Sigma = Var \rightarrow Value$.
2. The effect of executing a statement S is a state transformation: $\sigma \xrightarrow{S} \sigma^1$ Details of Var and Value are left unspecified, as they are not important for our purposes. (See Java subsets, Atshushi Igarashi, Benjamin Pierce, and Philip Wadler, "Featherweight Java: A minimal core calculus for Java" and GJ, In Proc. SIGPLAN/Conference an Object-Oriented Programmin, Systems, Languages and Applications (OOPSLA'99), pages 132–146, ACM, November 1999 and 12. Tobias Nipkow and David von Oheimb. "Java light is type safe—definitely", In Proc. SIG-PLAN/SIGACT Symposium on Principles of Program Languages (POPL'98), pages 161–170. ACM, January 1998). Var includes local variables, parameters, and this-pointers in method invocation stack frames—note that the domain of Var may change as execution proceeds. Value comprises primitive values (e.g., integers) and objects in the heap. In order to model reference-typed fields, we assume that Var also contains an element for each field f of an object o, where o is an object in Value whose type contains a field f (either directly or through inheritance).

Now let us assume that we have a hierarchy $\mathcal{H}$ together with some client code K which is type correct with respect to $\mathcal{H}$. We define:

Definition 9 (execution sequence).
1. An execution sequence of a hierarchy $\mathcal{H}$ is the (finite or infinite) sequence of statements $E(\mathcal{H}, K, I, \sigma_0) = S_1, S_2, S_3, \ldots$ which results from executing the client code K of $\mathcal{H}$ with input I in initial state $\sigma_0$. The corresponding sequence of program states is $\Sigma(\mathcal{H}, K, I, \sigma_0) = \sigma_0 \rightarrow \sigma_1 \rightarrow \sigma_2 \rightarrow \sigma_3. \ldots$
2. The statement subsequence of $S_1, S_2 \ldots$ consisting only of member accesses (data member accesses or method calls) is denoted $M(\mathcal{H}, K, I, \sigma_0) = S_1, S_2, \ldots$ where $Sv_i = S_j \in E(\mathcal{H}, K, I, \sigma_0)$. The corresponding sequence of invoked target methods is denoted $T(\mathcal{H}, K, I, \sigma_0) = tv_1, tv_2, \ldots$ where each $tv_1$ is the method that is actually invoked at run-time.

Definition 10 states that two hierarchies $\mathcal{H}$ and $\mathcal{H}'$ are behaviorally equivalent if the same sequence of statements is executed using the two hierarchies, for all given clients of $\mathcal{H}$ with appropriate inputs and initial states. Definition 11 states that a composed hierarchy $\mathcal{H}_1 \oplus \mathcal{H}_2$ exhibits dynamic interference if $\mathcal{H}_1$ and $\mathcal{H}_1 \oplus \mathcal{H}_2$ are not behaviorally equivalent (for some client of $\mathcal{H}_1$ with associated input and initial state), or if $\mathcal{H}_2$ and $\mathcal{H}_1 \oplus \mathcal{H}_2$ are not behaviorally equivalent (for some client of $\mathcal{H}_2$ with associated input and initial state).

Definition 10 (behavioral equivalence). Two hierarchies $\mathcal{H}, \mathcal{H}'$ are behaviorally equivalent if for all clients K of $\mathcal{H}$ with appropriate inputs and initial states I, $\sigma_0$ we have that $E(\mathcal{H}, K, I, \sigma_0) = E(\mathcal{H}', K, I, \sigma)$.

Definition 11 (dynamic interference). $\mathcal{H}_1 \oplus \mathcal{H}_2$ contains dynamic interference, if (for some $\mathcal{H}_1$-client K with associated I, $\sigma_0$) $\mathcal{H}_1$ and $\mathcal{H}_1 \oplus \mathcal{H}_2$ are not behaviorally equivalent, or if (for some $\mathcal{H}_2$-client K with associated I, $\sigma_0$) $\mathcal{H}_2$ and $\mathcal{H}_1 \oplus \mathcal{H}_2$ are not behaviorally equivalent.

Remark. From an observational point of view, $E(\mathcal{H}_1, K, I, \sigma_0) = E(\mathcal{H}_1, \mathcal{H}_2, K, I, \sigma_0)$ is not a necessary condition for behavioral equivalence, because a modified sequence of statements might still produce the same visible effects. However, we are not interested in cases where the observable behavior of a client of a composed hierarchy is accidentally identical to its original behavior.

Checking for Dynamic Interference

We would like to verify whether or not a certain composition exhibits dynamic interference. In general, determining whether or not two arbitrary programs will execute the same statement sequences for all possible inputs is undecidable of course. However, for the compositions studied in this present invention, the situation is not hopeless. Our approach will be to develop a noninterference criterion that implies $E(\mathcal{H}_1, K, I, \sigma_0) = E(\mathcal{H}_1 \oplus \mathcal{H}_2, K, I, \sigma_0)$ that is based on static analysis information. This approach is also used in our earlier work on semantics-preserving class hierarchy transformations see generally G. Snelting and F. Tip. "Understanding Class Hierarchies Using Concept Analysis" ACM Trans. on Programming Languages and Systems, pages 540–582, May 2000 and Gregor Snelting and Frank Tip "Reengineering class hierarchies using concept analysis" In Proc. ACM SIGSOFT Symposium on the Foundations of Software Engineering, pages 99–110, Orlando, Fla., November 1998. Being a sufficient, but not a necessary condition, our criterion may occasionally generate false alarms. However, we believe that the impact analysis of Section 4 will provide the user with sufficient information to determine whether reported interferences can occur in practice.

Definition 12 defines a function srcHierarchy that defines the class hierarchy that a program construct originated from. The srcHierarchy of an object is defined as the srcHierarchy of the statement that created it. Definition 13 uses srcHierarchy to define the projection of a state onto a hierarchy.

Definition 12 (srcHierarchy). For $\mathcal{H} = (C, \leqq)$, $C = <c, M> \in \mathcal{H}$, $m \in M$ and a statement s in body (m), we write srcHierarchy(C)=srcHierarchy(m)=srcHierarchy(s)=$\mathcal{H}$.
Moreover, let s=new C( . . . ) be an object creation site, and let object o∈Value be an instance of C created by s at run-time. Then, srcHierarchy (o)=srcHierarchy (s). Further, for any x∈Var, we define srcHierarchy(x)=srcHierarchy(s), where s is the static program part responsible for the creation of x at run-time.

Definition 13 (state projection). The projection of a program state $\sigma$ onto a hierarchy $\mathcal{H}$ is defined as $\sigma|\mathcal{H} = \{x \mapsto v | x \mapsto v \in \sigma, srcHierarchy(x) = \mathcal{H}\}$. Moreover, we extend the projection operator to apply to a sequence of program states as follows:

$\Sigma(\mathcal{H}_1 \oplus \mathcal{H}_2, K, I, \sigma_0)|\mathcal{H}_1 = \sigma_0|\mathcal{H}_1 \to \sigma_1|\mathcal{H}_1 \to \sigma_2|\mathcal{H}_1 \to \ldots$,
where $\Sigma(\mathcal{H}_1 \mathcal{H}_2, K, I, \sigma_0) = \sigma_0 \to \sigma_1 \to \sigma_2 \to$ The noninterference criterion relies on information produced by a points-to analysis. A points-to analysis computes for each reference-typed variable the set of objects that it may point to. Definitions 14 and 15 define appropriate notions ObjectRefs of object references and Objects of objects.

Definition 14 (object reference). Let $\mathcal{H}$ be a hierarchy. Then, ObjectRefs $(\mathcal{H}) \subseteq$ Var is the set of all object references in $\mathcal{H}$. This includes class-typed local variables, method parameters, fields, static variables, and this pointers of methods.

Definition 15 (object). Let $\mathcal{H}$ be a hierarchy. Then, Objects($\mathcal{H}$) is the set of all object creation sites in $\mathcal{H}$, that is, all statements S≡new C( . . . ); occurring in some method body. Moreover, for o∈Objects($\mathcal{H}$), o≡new C( . . . ), we define TypeOf ($\mathcal{H}$, o)=C.

Object creation sites in Objects($\mathcal{H}$) should not be confused with run-time objects in Value. Finally, Definition 16 formalizes the notion of points-to sets. We do not make any assumptions about the specific algorithm used to compute these points-to sets. Any method suitable for object-orientated languages will do such as Donglin Liang, Maikel Pennings, and Mary Jean Harrold Extending and evaluating flow-insenstitive and context-insensitive points-to analyses for java. In Proc. ACM SIG-PLAN/SIGSOFT Workshop on Program Analysis for Software Tools and Engineering (PASTE'01, pages 73–79, Snowbird, Utah, 2001 and Atanas Rountev, Ana Milanova, and Barbara G. Ryder. Points-to analysis for java using annotated constraints. In Proc. ACM SIGPLAN Conf. on Object-Oriented Programming Systems, Languages, and Applications (OOPSLA'01), Tampa, Fla., 2001.

Definition 16 (points-to sets). Let $\mathcal{H}$ be a hierarchy, and let p∈ObjectRefs ($\mathcal{H}$). Then PointsTo($\mathcal{H}$, p)$\subseteq$ Objects ($\mathcal{H}$) is the set of all objects (represented by creation sites) that object reference p might point to at run-time.

The noninterference criterion (Definition 17) states that the method invoked by a virtual method call p.m( . . . ) (as determined by applying StaticLookup on the receiver object) in $\mathcal{H}_1 \oplus \mathcal{H}_2$ is the same as it was in $\mathcal{H}_1$. Note that the condition does not say anything about $\mathcal{H}_2$ objects. While the points-to sets in the composed hierarchy may also contain $\mathcal{H}_2$ objects, these objects are never created by clients of $\mathcal{H}_1$, and therefore need not be considered.

Definition 17 (noninterference criterion).

A composition $\mathcal{H}_1 \oplus \mathcal{H}_2$ meets the noninterference criterion if for all p∈ObjectRefs ($\mathcal{H}_1$), for all method calls p.m( . . . ) in $\mathcal{H}_1$, and for all o∈PointsTo($\mathcal{H}_1 \mathcal{H}_2$, p) $\cap$ Objects ($\mathcal{H}_1$) we have that StaticLookup($\mathcal{H}_1$, T, m)=StaticLookup($\mathcal{H}_1 \oplus \mathcal{H}_2$, T', m) where T=TypeOf ($\mathcal{H}_1$, o), and T'=TypeOf($\mathcal{H}_1 \oplus \mathcal{H}_2$, o).

The use of points-to information deserves a few more comments. First, one might wonder about the consequences of using imprecise points-to information (i.e., overly large points-to sets). In this case, the "for all o" in the noninterference criterion runs over a larger scope than necessary, making the criterion stronger than necessary, and spurious interference may be reported. However, the criterion is safe in the sense that it will never erroneously report non-interference.

Note also that the criterion is much more precise than the static checks from Section 2. To see this, consider again the examples of FIGS. 5 and 6. One could argue that the simple interferences in these examples are not really dynamic. In fact, one could report static interference in the examples of FIGS. 5 and 6 by modifying members(C) to also include members in superclasses of C (as opposed to only the members defined locally in C). So why use the more complex criterion of Definition 17? The reason is that, for large programs, the suggested modified static interference check will report interference even if the class exhibiting the changed behavior is never used in the program. In Definition 17, the scope of the key condition StaticLookup($\mathcal{H}_1 \oplus \mathcal{H}_2$, T, m)=StaticLookup($\mathcal{H}_1$, T', m)

is limited by the size of the points-to set associated with the receiver of the method call. This effectively restricts the condition to method calls that are actually reachable, and to many fewer spurious interferences being reported.

Most points-to analysis algorithms compute information that is valid for a specific client K This has the advantage that the points-to sets are more precise, reducing the number of false alarms. However, in this case the noninterference criterion only holds for the client K. To compute results that are safe for any client, one could employ algorithms such as Atanas Rountev, Barbara G. Ryder, and William Landi, "Data-flow analysis of program fragments" In Proceedings of Symposium on the Foundations of Software Engineering (FSE 1999), pages 235–252, Toulouse, France, 1999 that are capable of analyzing incomplete programs.

Concerning the complexity of the interference test, it is dominated by the computation of points-to information, as the test itself just performs two static lookups per member access, which is linear in the program size. Various points-to algorithms of various precisions are known, ranging from Steengaard's almost linear algorithm (which scales millions of LOC) to Andersen's cubic algorithm which has recently been scaled to a million-line C-program by using a new approach for dynamically computing transitive closures. The performance of this algorithm on object-oriented applications are still unknown, as far as we know.

Justification

We will now demonstrate that the noninterference criterion of Definition 17 ensures that the behavior of client K of $\mathcal{H}_1$ is preserved. The analogous argument for $\mathcal{H}_2$ is completely symmetrical.

Lemma 3 states that it is sufficient to demonstrate that the sequence of call targets in $\mathcal{H}_1$ does not change after composition.

Lemma 3. For all K, I and $\sigma_0$, we have that: $T(\mathcal{H}_1, K, I, \sigma_0) = T(\mathcal{H}_1 \oplus \mathcal{H}_2, K, I, \sigma_0) \Rightarrow E(\mathcal{H}_1, K, I, \sigma_0) = E(\mathcal{H}_1 \oplus \mathcal{H}_2, K, I, \sigma_0)$ and therefore: $T(\mathcal{H}_1, K, I, \sigma_0) = T(\mathcal{H}_1 \oplus \mathcal{H}_2, K, I, \sigma_0) \Rightarrow \Sigma(\mathcal{H}_1, K, I, \sigma_0) = \Sigma(\mathcal{H}_1 \oplus \mathcal{H}_2, K, I, \sigma_0)|\mathcal{H}_1$ Proof. The proof is by induction on the length n of sequence $E(\mathcal{H}_1, K, I, \sigma_0)$. For n=0, the statement is trivial, as both hierarchies start in state $\sigma_0$. Now consider statement Sn in $E(\mathcal{H}_1, K, I, \sigma_0)$. By induction, the previously executed statements $S_1, S_2, \ldots S_{n-1}$ are the same in both $E(\mathcal{H}_1, K, I, \sigma_0)$ and $E(\mathcal{H}_1 \oplus \mathcal{H}_2, K, I, \sigma_0)$, and lead to corresponding states $\sigma_{n-1}$ and $\sigma_{n-1}|\mathcal{H}_1$, respectively.

Now, $S_n$ is a statement at some position $\pi$ in some method $m_1$ of $\mathcal{H}_1$. By assumption, the sequence of executed method bodies is the same in $\mathcal{H}_1 \oplus \mathcal{H}_2$. Since there is no static interference, we may conclude that we are at the same position $\pi$ in some method $m_2$ in $\mathcal{H}_1 \oplus \mathcal{H}_2$, for which body($m_1$)=body($m_2$). Hence, $S_n$ is also the next statement to be executed in $E(\mathcal{H}_1 \oplus \mathcal{H}_2, K, I, \sigma_0)$.

Now there are two cases. 1) $S_n$ is a method call p.m( . . . ). Then, by assumption, this call resolves to the same target $tv_1$ which is executed in the same state $\sigma_{n-1}$. Thus, after execution of the method body, both hierarchies are in the same state $\sigma_n$ at the same position $\pi'$ in the same method bodies $m_1$ and $m_2$.) $S_n$ is not a method call. Then, it must be the same in $m_1$ and $m_2$ due to the absence of static interference. Hence, after execution, the same state $\sigma_n$ is reached.

Theorem 1 (correctness of criterion). Let $\mathcal{H}_1 \oplus \mathcal{H}_2$ be a composition that meets the noninterference criterion of Definition 17. Then, we have that: $E(\mathcal{H}_1, K, I, \sigma_0) = E(\mathcal{H}_1 \oplus \mathcal{H}_2, K, I, \sigma_0)$ and $\Sigma(\mathcal{H}_1, K, I, \sigma_0) = \Sigma(\mathcal{H}_1 \oplus \mathcal{H}_2, K, I, \sigma_0)|\mathcal{H}_1$, for all $K, I, \sigma_0$.

Proof. Again the proof is by induction on n. For n=0 the statement is trivial, as both hierarchies start in state $\sigma_0$. Now consider statement $S_n$ in $E(\mathcal{H}_1, K, I, \sigma_0)$. By induction, the previously executed statements $S_1, S_2, \ldots S_{n-1}$ are the same in both $E(\mathcal{H}_1, K, I, \sigma_0)$ and $E(\mathcal{H}_1 \oplus \mathcal{H}_2, K, I, \sigma_0)$ and lead to corresponding states $\sigma_{n-1}$ and $\sigma_{n-1}|\mathcal{H}_1$, respectively. As in the previous lemma, we may conclude that $S_n$ is the same in both execution sequences. (This time the necessary fact that the previous call targets have been the same is not by assumption, but by induction: if $S_1, S_2, \ldots$ are the same in both $E(\mathcal{H}_1, K, I, \sigma_0)$ and $E(\mathcal{H}_1 \oplus \mathcal{H}_2, K, I, \sigma_0)$, so are $S_1, S_2, \ldots$ and $tv_1, tv_2, \ldots$).

Now there are two cases. If $S_n$ is not a method call or data member access, we may conclude that the corresponding states $\sigma_n$ and $\sigma_n|\mathcal{H}_1$ are produced in $\Sigma(\mathcal{H}_1, K, I, \sigma_0)$ and $\Sigma(\mathcal{H}_1 \oplus \mathcal{H}_2, K, I, \sigma_0)|\mathcal{H}_1$, respectively. In case $S_n$=p.m(x), we know $\sigma_{n-1}(p) \in \text{PointsTo}(\mathcal{H}_1 \oplus \mathcal{H}_2, p)$ (remember that $\sigma_{n-1}$ was reached in both $\mathcal{H}_1$ and $\mathcal{H}_1 \oplus \mathcal{H}_2$). Furthermore, $\sigma_{n-1}(p) \in \text{Objects}(\mathcal{H}_1)$, as $\sigma_{n-1}|\mathcal{H}_1 \in \Sigma(\mathcal{H}_1, K, I, \sigma_0)$, and $\mathcal{H}_1$ does not contain $\mathcal{H}_2$ objects.

We know StaticLooku($\mathcal{H}_1$, TypeOf($\mathcal{H}_1$,o), m)$\neq \bot$ and by the type correctness lemma thus StaticLookup($\mathcal{H}_1 \oplus \mathcal{H}_2$, TypeOf($\mathcal{H}_1 \oplus \mathcal{H}_2$, o), m)$\neq \bot$. By the static noninterference criterion, both static lookups must compute the same result, namely method definition (resp. data member) m. After execution of m's body (resp. access to m's value in state $\sigma_{n-1}$), we may as in the above lemma conclude that execution of both hierarchies is in the same state $\sigma_n$.

EXAMPLE 6

For the example of FIG. 5, we have PointsTo($\mathcal{H}_1$, o)=PointsTo($\mathcal{H}_1 \oplus \mathcal{H}_2$, o)={B1}. For the method call o.foo( ), we obtain StaticLookup ($\mathcal{H}_1$, TypeOf($\mathcal{H}_1$,$B_1$), foo( ))=StaticLookup ($\mathcal{H}_1$, B, foo( ))=A.foo( ), but StaticLookup($\mathcal{H}_1 \oplus \mathcal{H}_2$,TypeOf($\mathcal{H}_1 \oplus \mathcal{H}_2$, B1), foo( ))= StaticLookup($\mathcal{H}_1 \oplus \mathcal{H}_2$, B, foo( ))=B.foo( ). Hence, dynamic interference is reported.

In Example 7 and in subsequent examples, we use the labels shown in boxes in FIG. 1 to identify object creation sites.

EXAMPLE 7

For client Driver1.main( ) in FIG. 2, we obtain PointsTo($\mathcal{H}_1 \oplus \mathcal{H}_2$, c1) $\cap$Objects($\mathcal{H}_1$)={C1}, PointsTo($\mathcal{H}_1 \oplus \mathcal{H}_2$, p1) $\cap$Objects( $\mathcal{H}_1$)={P1}. Hence, StaticLookup($\mathcal{H}_1$, TypeOf($\mathcal{H}_1$, C1), enroll( ))=Course.enroll( )=StaticLookup($\mathcal{H}_1 \oplus \mathcal{H}_2$, TypeOf($\mathcal{H}_1 \oplus \mathcal{H}_2$, C1), enroll( )). Moreover, we have that StaticLookup($\mathcal{H}_1$, TypeOf($\mathcal{H}_1$, C1), assign( ))=Course.assign( )= StaticLookup($\mathcal{H}_1 \oplus \mathcal{H}_2$, TypeOf($\mathcal{H}_1 \oplus \mathcal{H}_2$, C1), assign( )), and that StaticLookup( $\mathcal{H}_1$,TypeOf($\mathcal{H}_1$, P1), approveGraduationo)=Professor.approveGraduation( )= StaticLookup($\mathcal{H}_1 \oplus \mathcal{H}_2$,TypeOf($\mathcal{H}_1 \oplus \mathcal{H}_2$, P1), Professor.approveGraduation( )). Similar arguments can be made for all other method calls in FIG. 2. Hence, the behavior of Driver1.main( ) in $\mathcal{H}_1$ is preserved in $\mathcal{H}_1 \oplus \mathcal{H}_2$. In fact, the basic composition in FIG. 2 preserves the behavior of any possible client. Potential clients may introduce arbitrary allocation sites and arbitrary points-to relationships. A conservative approximation must therefore assume that for any member access p.m( . . . )$\in \mathcal{H}_1$, PointsTo($\mathcal{H}_1 \oplus \mathcal{H}_2$, p) $\cap$ Objects($\mathcal{H}_1$) contains all allocation sites S$\in$Objects($\mathcal{H}_1$) where TypeOf($\mathcal{H}_1 \oplus \mathcal{H}_2$, S)$\leq$TypeOf($\mathcal{H}_1 \oplus \mathcal{H}_2$, P). Nevertheless, StaticLookup($\mathcal{H}_1$, TypeOf($\mathcal{H}_1$, S), m)=StaticLookup($\mathcal{H}_1 \oplus \mathcal{H}_2$, TypeOf($\mathcal{H}_1 \oplus \mathcal{H}_2$, S), m), because in the example the methods from $\mathcal{H}_1$ and $\mathcal{H}_2$ are either disjoint or identical.

Overriding Compositions

The noninterference criterion was designed for basic compositions. It can be applied to overriding compositions as well, but will report failure as soon as a method call p.m( . . . ) resolves to methods that have different bodies in $\mathcal{H}_1$ and $\mathcal{H}_1 \oplus \mathcal{H}_2$. Nevertheless, interference checks may still succeed if the overridden methods are not reachable from client code. Constructing an interference check for overriding compositions that ignores conflicts that users are aware of (via the <<-ordering) is a topic for future research.

EXAMPLE 8

Let us apply the criterion to FIG. 6. We have PointsTo($\mathcal{H}_1$, a)=PointsTo($\mathcal{H}_1 \oplus \mathcal{H}_2$, a)={B1}, but due to the overriding, StaticLookup($\mathcal{H}_1$, TypeOf($\mathcal{H}_1$, $B_1$), foo( )= A.foo( )$\mathcal{H}_1 \neq$A.foo( )$\mathcal{H}_2$=StaticLookup ($\mathcal{H}_1 \oplus \mathcal{H}_2$, TypeOf($\mathcal{H}_1 \oplus \mathcal{H}_2$, $B_1$), foo( )). Here, we use subscripts $\mathcal{H}_1$ and $\mathcal{H}_2$ to indicate the hierarchies that the different methods A.foo( ) originate from. Hence, the behavior of call a.foo( ) is not preserved. For call x.bar( ), we obtain PointsTo($\mathcal{H}_1 \oplus \mathcal{H}_2$, x)={B2}, hence PointsTo($\mathcal{H}_1 \oplus \mathcal{H}_2$, x) $\cap$ Objects($\mathcal{H}_1$)=$\emptyset$ Thus the criterion is trivially satisfied for x.bar( ).

Remark: In Example 8, one might wonder why the criterion is satisfied for x.bar( ) despite the fact that the behavior of this call obviously changed: We have that B.bar( ) is called in $\mathcal{H}_1 \oplus \mathcal{H}_2$ whereas A.bar( ) was called in $\mathcal{H}_1$. This secondary behavioral change is caused by another change in behavior (in this case, the changed behavior of call a.foo( ), which causes x to be bound to an object of type B). While the noninterference criterion does not necessarily detect secondary behavioral changes, it does find all primary changes, which suffices to guarantee behavioral equivalence. We plan to use impact analysis to obtain a more precise understanding of where behavioral changes occur, as will be discussed in Section 4.

Impact Analysis

When the purpose of composition is to add functionality that is not completely orthogonal to the system's existing functionality, changes in behavior are often unavoidable. The interference check of Section 3 determines whether the behavior of a specific client K is affected. In principle, one could manually apply the interference check to successively smaller clients to determine the impact of the composition. However, such a non-automated process would be tedious and labor-intensive, and problematic in cases where it is not possible to partition the code in K In order to provide a less labor-intensive approach, we plan to adapt the change impact analysis of Barbara, G. Ryder and Frank Tip. Change impact analysis for object-oriented programs. In Proceedings of the ACM SIGPLAN-SIGSOFT Workshop on Program Analysis for Software Tools and Engineering (PASTE'01), pages 46–53, Snowbird, Utah. June 2001 in order to automatically determine the set of program constructs affected by a composition. The remainder of this section presents some preliminary ideas on how this can be accomplished.

Change Impact Analysis

We begin with a brief review of the change impact analysis. In this work, it is assumed that a program is covered by a set of regression test drivers $T=t_1, \ldots, t_n$. Each test driver is assumed to consist of a separate main routine from which methods in the application are called. Prior to the editing session, a call graph $G_i$ is built for each $t_1$. Any of several existing call graph construction algorithms can be used. We plan to employ an algorithm that has been demonstrated to scale to large applications see generally Frank Tip and Jens Palsberg, "Scalable Propagation-Based Call Graph Construction Algorithms", In Proc. ACM SIGPLAN Conf. on Object-Oriented Programming Systems, Languages, and Applications (OOPSLA'00), pages 281–293, Minneapolis, Minn., 2000. SIGPLAN Notices 35(10).

After the user has ended the editing session, the edits are decomposed into a set A of atomic changes. A consists of (i) a set AC of (empty) classes that have been added, (ii) a set DC of classes that have been deleted, (iii) a set AM of methods that have been added, (iv) a set DM of methods that have been deleted, (v) a set CM of methods whose body contains one or more changed statements, (vi) a set AF of fields that have been added,(vii) a set DF of fields that have been deleted, and (viii) a set LC of elements of the form <T, C.m( )>, indicating that the dispatch behavior for a call to C.m( ) on an object type T has changed. In general, a simple user edit can imply several atomic changes. For example, addition of a method may involve the addition of an empty method (in AM), a change in dispatch behavior (in LC) of existing call sites in cases where the added method overrides an existing method, and a change of a method body (in CM).

By analyzing the call graphs $G_i$ and the set of atomic changes A, a subset of affected tests $T' \subseteq T$ is determined. FIG. 7 shows how correlating the nodes and edges in the call graphs for the test drivers with the CM, DM, and LC changes leads to the identification of a set of affected tests $t_i$. Here, Nodes(P, $t_i$) and Edges(P, $t_i$) denote the set of nodes resp. edges in the call graph for test driver $t_i$. Informally, the formula shown in the figure states that a test driver $t_i$ is potentially affected if a node in the call graph for $t_i$ corresponds to a deleted or changed method (line1), or if one of the edges in the call graph for $t_i$ corresponds to a dispatch relation that has been changed (lines2 3).

Any test driver that is not in T' is guaranteed to have the same behavior as before. If a test driver $t_i$ occurs in T, the user can run this test to determine if the new behavior of the test meets his expectations. If this is not the case, an additional analysis (also based on call graphs) determines a subset of atomic changes $A' \subseteq A$ that contribute to $t_i$'s altered behavior. The user can apply successively larger subsets of A' to identify the change that "broke" test driver $t_i$. Alternatively, divide-and-conquer strategies can be applied to quickly narrow down the search space such as Andreas Zeller "Yesterday my program worked. Today, it does not. Why?" In Proc. of the 7th European Software Engineering Conf./7th ACM SIGSOFT Symp. on the Foundations of Software Engineering (ESEC/FSE'99), pages 253–267, Toulouse, France, 1999.

Impact Analysis for Composition

We adapt the analysis to determine the impact of a composition $\mathcal{H}_1 \oplus \mathcal{H}_2$ on a set of test drivers $T=t_1, ,t_k$ associated with hierarchy $H_i$ by interpreting a composition as a set of changes w.r.t $\mathcal{H}_i$ such as Barbara G. Ryder and Frank Tip. Change impact analysis for object-oriented programs such as In Proceedings of the ACM SIGPLAN-SIGSOFT Workshop on Program Analysis for Software Tools and Engineering (PASTE'01), pages 46–53, Snowbird, Utah. June 2001. To do so, we need to establish a relationship between classes/members in $\mathcal{H}_1 \oplus \mathcal{H}_2$, and the classes/members in $\mathcal{H}_1$ and $\mathcal{H}_2$ that these classes/members originate from. This is expressed by Definition 18 below.

Definition 18 (origin). Let $\mathcal{H}_1=(C_1, \leq_1)$ and $\mathcal{H}_2=(C_2, \leq_2)$ be two class hierarchies, let $\mathcal{H}=\mathcal{H}_1 \oplus \mathcal{H}_2=(C, \leq)$, and let $\epsilon$ be the set of equivalence classes constructed by Definition 2. Furthermore, let C be a class in C, and let m∈members (C).

Define:

origin(C)={<C', $\mathcal{H}$>|S∈$\epsilon$, name(S)=name(C), <C', $\mathcal{H}$>∈S} origin(m)={<C', m', $\mathcal{H}$>|<C', $\mathcal{H}$>∈origin(C), m'∈members (C'), namesig(m)=namesig(m'), body (m)=body(m')}

Definition 18 defines the origin of a class C in C as the set of (class,hierarchy) pairs in its equivalence class, and the origin of a method m in C is the set of methods in each such class with the same name and body as m. Note that these definitions work with both of the members definitions given earlier.

EXAMPLE 9

For hierarchy $\mathcal{H}=\mathcal{H}_1 \oplus \mathcal{H}_3$ of FIG. 3 we have origin (Professor)={<Professor, $\mathcal{H}_1$>, <Professor, $\mathcal{H}_3$>} and origin (Professor.approveGraduation)={<Professor, approveGraduation, $\mathcal{H}_3$>}.

It is now straightforward to construct the sets of atomic changes w.r.t. one of the original hierarchies. For example, for the composition $\mathcal{H}=\mathcal{H}_1 \oplus \mathcal{H}_3$, where $\mathcal{H}=<C, \leq>$, $\mathcal{H}_1=<C_1, \leq_1>$, and $\mathcal{H}_3=<C_4, \leq_4>$, the sets AC and CM w.r.t. $\mathcal{H}_1$ may be computed as:

AC={C'|<C', $\mathcal{H}'$>∈origin(C), C∈C, $\mathcal{H}' \neq \mathcal{H}_1$}

CM={m'|<C', $\mathcal{H}_1$>∈origin(C), C∈C, m'∈members (C), origin(m')=$\emptyset^{\not= m}$ in members (C')s.t. namesig(m)= namesig(m') and body(m)=body(m)}

The other sets of atomic changes are computed similarly. We can now apply the analysis to determine the impact of the composition.

EXAMPLE 10

Consider the overriding composition of FIG. 3, for which we previously found that behavior could not be preserved (see Example 8). We will now apply impact analysis to obtain a more precise understanding of where the inferences occur. Interpreting the $\mathcal{H}_1 \oplus \mathcal{H}_3$, as a set of changes w.r.t. $\mathcal{H}_1$, we find that Driver1.main( ) is affected, because CM contains method Professor.approveGraduation( ), which occurs in the call graph for Driver1.main( ). Moreover, interpreting $\mathcal{H}_1 \oplus \mathcal{H}_3$ as a set of changes w.r.t. $\mathcal{H}_3$, we find that Driver3.main( ) is not affected, because the call graph for Driver3.main( ) does not contain any added, changed, or deleted methods, or any edges corresponding to a changed dispatch behavior.

Thus far, we have computed the impact of a composition on a set of test drivers. In order to obtain more fine-grained information, one could construct a separate call graph for each method m in hierarchy $\mathcal{H}_1$ (using appropriate conservative assumptions about the run-time types of parameters and accessed fields), and proceed as before. Then, impact could be reported as the set of methods whose behavior might have changed. For example, if separate call graphs are constructed for all methods of $\mathcal{H}_1$ in the overriding composition $\mathcal{H} \oplus \mathcal{H}_3$ of FIG. 3, we can report that only the behavior of methods Driver1.main( ) and Professor.approveGraduation( ) is impacted by the composition because these are the only methods that transitively call methods whose behavior may have changed. Space limitations prevent us from providing more details.

Related work

We already discussed how our impact analysis is a derivative of the change impact analysis (see Barbara G. Ryder and Frank Tip. Change impact analysis for object-oriented programs. In Proceedings of the ACM SIGPLAN-SIGSOFT Workshop on Program Analysis for Software Tools and Engineering (PASTE'01), pages 46–53, Snowbird, Utah., June 2001). Offutt and Li (see Michelle L. Lee, "Change Impact Analysis Of Object-Oriented Software", PhD thesis, George Mason University, 1998 and Michelle L. Lee and A. Jefferson Offutt, "Algorithmic Analysis Of The Impact Of Changes To Object-Oriented Software", in IEEE International Conference on Software Maintenance, pages 171–184, Monterey, Calif., November 1996) also presented a change impact analysis for object oriented programs, which only relies on structural relationships between classes and members (e.g., containment), and is therefore much less precise than approaches such as Barbara G. Ryder and Frank Tip, "Change Impact Analysis For Object-Oriented Programs", in Proceedings of the ACM SIGPLAN-SIGSOFT Workshop on Program Analysis for Software Tools and Engineering (PASTE'01), pages 46–53, Snowbird, Utah., June 2001 that rely on static analysis.

Exemplary Implementations

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

An embodiment of the present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer system to read such computer readable information.

Figure 8:
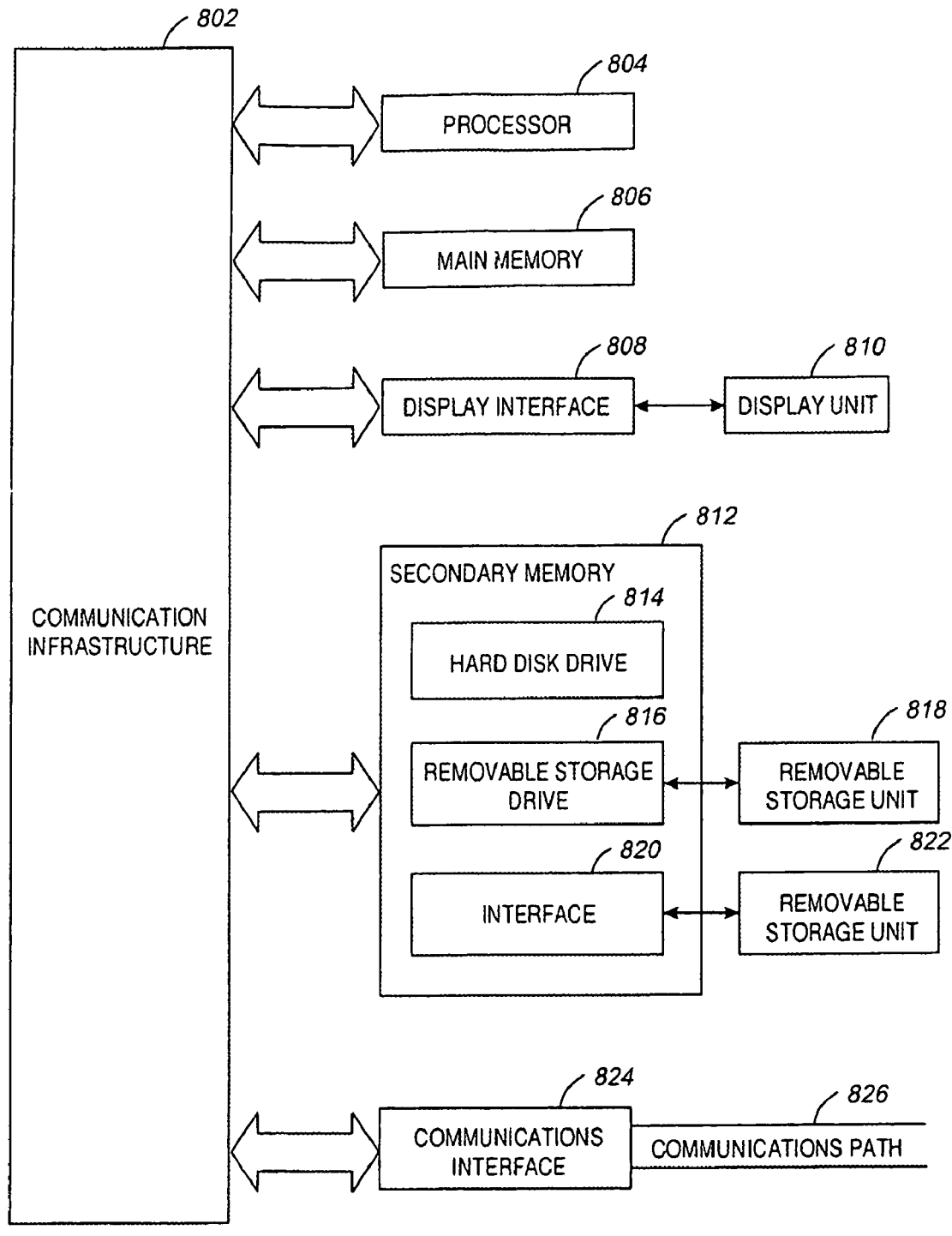
FIG. 8 is a block diagram depicting the hardware hierarchy of a computer system useful for implementing an embodiment of the present invention.

FIG. 8 is a block diagram depicting the hardware hierarchy of a computer system useful for implementing an embodiment of the present invention. The computer system includes one or more processors, such as processor 804. The processor 804 is connected to a communication infrastructure 802 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 808 that forwards graphics, text, and other data from the communication infrastructure 802 (or from a frame buffer not shown) for display on the display unit 810. The computer system also includes a main memory 806, preferably random access memory (RAM), and may also include a secondary memory 812. The secondary memory 812 may include, for example, a hard disk drive 814 and/or a removable storage drive 816, representing a floppy disk drive, a magnetic tape drive, an optical disk drive, etc. The removable storage drive 816 reads from and/or writes to a removable storage unit 818 in a manner well known to those having ordinary skill in the art. Removable storage unit 818, represents a floppy disk, magnetic tape, optical disk, etc. which is read by and written to by removable storage drive 816. As will be appreciated, the removable storage unit 818 includes a computer usable storage medium having stored therein computer software and/or data.

In alternative embodiments, the secondary memory 812 may include other similar means for allowing computer programs or other instructions to be loaded into the computer system. Such means may include, for example, a removable storage unit 822 and an interface 820. Examples of such may include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to the computer system.

The computer system may also include a communications interface 824. Communications interface 824 allows software and data to be transferred between the computer system and external devices. Examples of communications interface 824 may include a modem, a network interface (such as an Ethernet card), a communications port, a PCM-CIA slot and card, etc. Software and data transferred via communications interface 824 are in the form of signals which may be, for example, electronic, electromagnetic, optical, or other signals capable of being received by communications interface 824. These signals are provided to communications interface 824 via a communications path (i.e., channel) 826. This channel 826 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 806 and secondary memory 812, removable storage drive 816, a hard disk installed in hard disk drive 814, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information.

Computer programs (also called computer control logic) are stored in main memory 806 and/or secondary memory 812. Computer programs may also be received via communications interface 824. Such computer programs, when executed, enable the computer system to perform the features of the present invention as discussed herein. In particular, the computer programs, when executed, enable the processor 804 to perform the features of the computer system. Accordingly, such computer programs represent controllers of the computer system.

Figure 9:
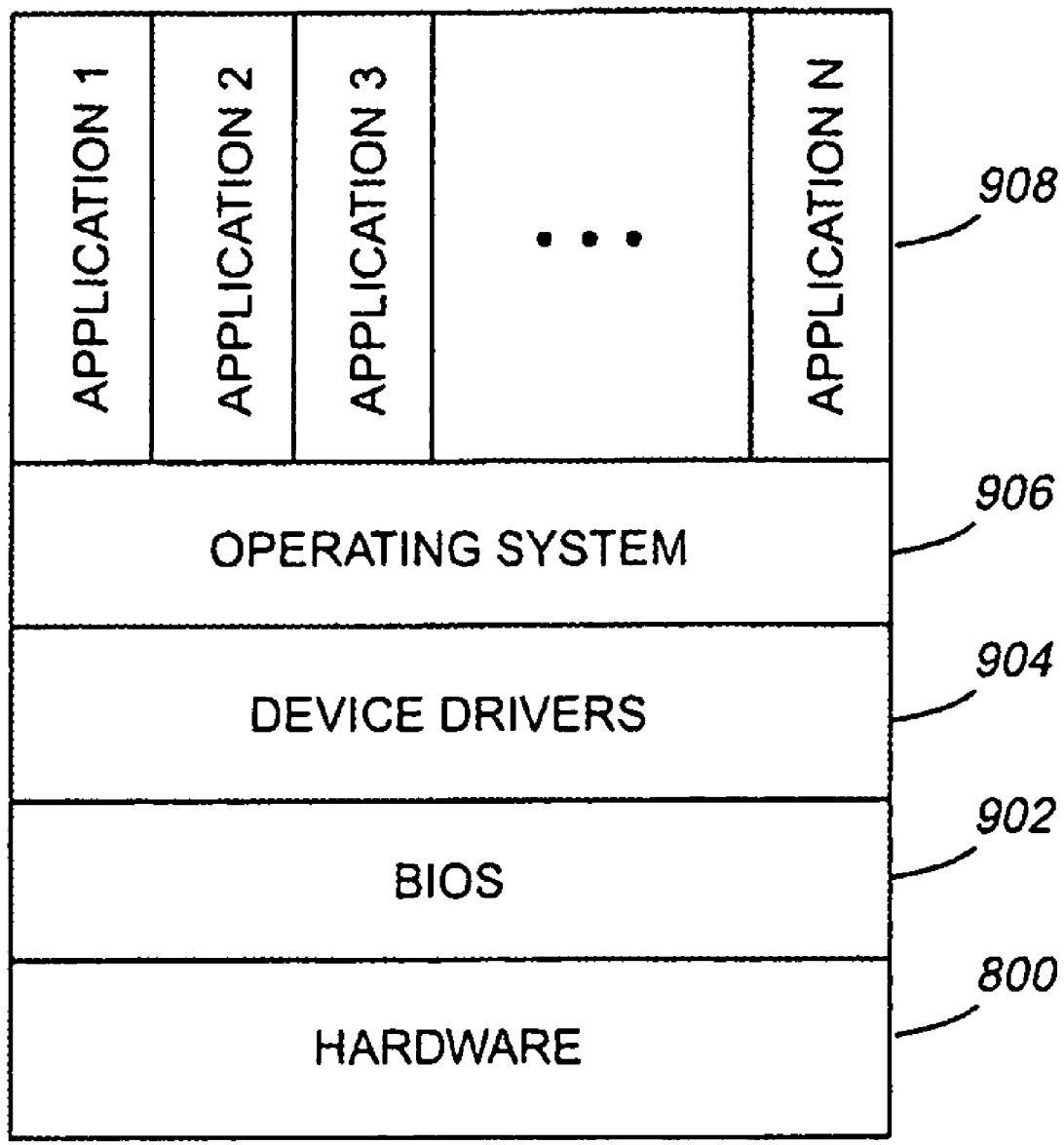
FIG. 9 is a block diagram illustrating the software hierarchy for the computer or other information processing device of FIG. 8 according to the present invention.

FIG. 9 is a block diagram illustrating the software hierarchy for the computer or other information processing device 800 of FIG. 8 according to the present invention. The hardware 800 is the information processing system of FIG. 8. BIOS (Basic Input Output System) 902 is a set of low level of computer hardware instructions, usually stored in main memory 806, for communications between an operating system 906, device driver(s) 9046 and hardware 800. Device drivers 906 are hardware specific code used to communicate between and operating system 906 and hardware peripherals such as a mouse, CD ROM drive or printer. Applications 908 are software application written in C/C++, Java, assembler or equivalent. Operating system 906 is the master program that loads after BIOS 902 initializes, that controls and runs the hardware 800. Examples of operating systems include DOS, Windows 3.1/95/98/NT, Unix, Macintosh, OS/2 and equivalent.

The present invention can be implemented as an application 808 such as a tool kit as part of a compiler such as IBM VisualAge™ line of products or IBM WebSphere™ those available from Borland or Microsoft and programming environments Eclipse or other open source platforms (www.eclipse.org). In another embodiment, the present invention is implemented as part of a compiler and messages are presented to a user during the reporting of behavior differences during the class compositions.

It is important to note, that any behavioral difference of methods and/or fields as compared application $A_1$ as executing against composed hierarchy $\mathcal{H}_3$ with application $A_1$ as executing against the composed hierarchy $\mathcal{H}_1$.(and similarly with $A_2$) can be formed into a report. In one embodiment this report is editable with interactive tools such as browsers and editors and portions of the program text that have behavior differences are marked or highlighted for user review.

NON-LIMITING EXMAPLES

It should be understood by those skilled in the art that the present invention provided a basis to provide better semantic support for composition-based software development. The present invention provides the basis for other work that includes:

- Handling the peculiarities of particular programming languages such as Java (exception handling) where the present invention abstracts away from peculiarities of specific programming languages.
- "Merging" compositions, in which two interfering methods $m_1$ and $m_2$ are "merged" in some user-specified way (e.g., by constructing a new method that first executes the body of $m_1$ and then that of $m_2$).
- More interference tests can that can provide behavioral guarantees even in the presence of dynamic interference, by taking into account those conflicts that users have explicitly resolved.
- We have outlined how the impact analysis can be used to obtain a more detailed view of where behavioral interferences occur. We consider this to be a topic that needs much further thought.
- In practice, class hierarchy compositions are often performed with the intention of changing program behavior. We consider methods for distinguishing behavioral changes expected by the user from unanticipated behavioral changes to be an important research topic. Such methods could be used to filter the information produced by the impact analysis.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A method on an information processing device for reporting any behavioral differences after composing two or more class hierarchies $\mathcal{H}_1$ and $\mathcal{H}_2$ with associated applications $A_1$ and $A_2$ respectively, the method on the information processing device comprising:

creating a composed hierarchy $\mathcal{H}_3$ by analyzing a hierarchy $\mathcal{H}_1$ and a hierarchy $\mathcal{H}_2$;

creating well-defined methods and/or fields in one or more classes of the hierarchy $\mathcal{H}_3$ by analyzing the hierarchy $\mathcal{H}_1$ and the hierarchy $\mathcal{H}_2$ and user-supplied information;

associating a definition of a method M in a class D in a hierarchy $\mathcal{H}$ with each executed call to a definition of a method M' in a class C in the hierarchy $\mathcal{H}$ where class D is a subtype of class C in a behavior in the hierarchy $\mathcal{H}$ for each of an application $A_1$ and an application $A_2$, wherein the method M and the method M' have an identical signature;

testing if two behaviors across the hierarchy $\mathcal{H}_1$ and the hierarchy $\mathcal{H}_3$ are different by comparing a behavior $B_3$ of the application $A_1$ in the composed hierarchy $\mathcal{H}_3$ with a behavior $B_1$ of the application $A_1$ in the hierarchy $\mathcal{H}_1$ and reporting any differences therebetween; and testing if two behaviors across the hierarchy $\mathcal{H}_2$ and the hierarchy $\mathcal{H}_3$ are different by comparing a behavior $B_4$ of the application $A_2$ in the composed hierarchy $\mathcal{H}_3$ with a behavior $B_2$ of the application $A_2$ in the hierarchy $\mathcal{H}_2$ and reporting any differences therebetween.

2. The method of claim 1, further comprising:

determining a behavior $B_1$ of the application $A_1$ in the hierarchy $\mathcal{H}_1$ by associating a method definition $M_1'$ in a class $D_1$ in the hierarchy $\mathcal{H}_1$ with each executed call to a method $M_1$ in class $C_1$ in the hierarchy $\mathcal{H}_1$, wherein the class $D_1$ is a subtype of the class $C_1$ in the hierarchy $\mathcal{H}_1$ and wherein the method $M_1$ and the method $M_1'$ have an identical signature;

determining a behavior $B_2$ of the application $A_2$ in the hierarchy $\mathcal{H}_2$ by associating a method definition $M_2'$ in a class $D_2$ in the hierarchy $\mathcal{H}_2$ with each executed call to a method $M_2$ in class $C_2$ in the hierarchy $\mathcal{H}_2$, wherein the class $D_2$ is a subtype of the $C_2$ in the hierarchy $\mathcal{H}_2$ and wherein the method $M_2$ and the method $M_2'$ have an identical signature;

determining a behavior $B_3$ of the application $A_1$ in the hierarchy $\mathcal{H}_3$ by associating a method definition $M_3'$ in a class $D_3$ in the hierarchy $\mathcal{H}_3$ with each executed call to a method $M_3$ in class $C_3$ in the hierarchy $\mathcal{H}_3$, wherein the class $D_3$ is a subtype of the $C_3$ in the hierarchy $\mathcal{H}_3$, wherein the method $M_3$ and the method $M_3'$ have an identical signature; and determining a behavior $B_4$ of the application $A_2$ in the hierarchy $\mathcal{H}_3$ by associating a method definition $M_4'$ in a class $D_4$ in the hierarchy $\mathcal{H}_3$ with each executed call to a method $M_4$ in class $C_4$ in the hierarchy $\mathcal{H}_3$, wherein the class $D_4$ is a subtype of the $C_4$ in the hierarchy $\mathcal{H}_3$, wherein the method $M_4$ and the method $M_4'$ have an identical signature.

3. The method of claim 1, further comprising:

determining, using program analysis, at least one of the following:

if the behavior of application $A_1$ when executed against the composed hierarchy $\mathcal{H}_3$ differs from the behavior of application $A_1$ when executed against the hierarchy $\mathcal{H}_1$; and if the behavior of application $A_2$ when executed against the composed hierarchy $\mathcal{H}_3$ differs from the behavior of application $A_2$ when executed against the hierarchy $\mathcal{H}_2$.

4. The method of claim 1, wherein the creating of the well-defined methods and fields of the composed hierarchy $\mathcal{H}_3$ includes using the user-supplied information to resolve conflicts between methods and/or fields that originate from the hierarchy $\mathcal{H}_1$ and the hierarchy $\mathcal{H}_2$.

5. The method of claim 1, further comprising:

reporting at least one of the composed hierarchy $\mathcal{H}_1$ and the composed hierarchy $\mathcal{H}_2$ is behavior-preserving in response to zero behavior differences having been reported.

6. The method of claim 1, wherein the creating of the well-defined classes in the composed hierarchy $\mathcal{H}_3$ is a basic composition involving the hierarchy $\mathcal{H}_1$ and the hierarchy $\mathcal{H}_2$ and where the hierarchy $\mathcal{H}_1$ and the hierarchy $\mathcal{H}_2$ do not contain static interference.

7. The method of claim 1, wherein the creating of the well-defined classes in the composed hierarchy $\mathcal{H}_3$ is an overriding composition involving the hierarchy $\mathcal{H}_1$ and the hierarchy $\mathcal{H}_2$ where the hierarchy $\mathcal{H}_1$ and the hierarchy $\mathcal{H}_2$ contains static interference.

8. The method of claim 1, wherein the creating of the well-defined classes in the composed hierarchy $\mathcal{H}_3$ is an overriding composition involving the hierarchy $\mathcal{H}_1$ and the hierarchy $\mathcal{H}_3$ and where the determining, using program analysis, includes precedence of members as part of the user-supplied information and where the hierarchy $\mathcal{H}_1$ and the hierarchy $\mathcal{H}_2$ contains static interference.

9. The method of claim 8, wherein the determining, using program analysis, includes determining if the composition of the hierarchy $\mathcal{H}_1$ and the hierarchy $\mathcal{H}_2$ contains dynamic interference.

10. The method of claim 8, wherein the determining, using program analysis, includes using impact analysis to determine any parts of the application $A_1$ and/or any parts of the application $A_2$ whose behavior have changed.

11. The method of claim 9, wherein the determining, using program analysis, includes using impact analysis to determine any parts of the application $A_1$ and/or parts of the application $A_2$ whose behavior have changed.

12. A method on an information processing device of composing two or more input class hierarchies $\mathcal{H}_1$ and $\mathcal{H}_2$ with associated applications $A_1$ and $A_2$ respectively, the method on the information processing device comprising:

determining a union of any inheritance relations in two or more input class hierarchies $\mathcal{H}_1$ and $\mathcal{H}_2$;

determining one or more cycles in a transitive closure of the inheritance relations, and constructing a set of equivalence classes $\epsilon$ corresponding to the cycles;

creating of a class in a composed hierarchy $\mathcal{H}_3$ for each equivalence class in $\epsilon$;

associating a definition of a method M in a class D in a hierarchy $\mathcal{H}$ with each executed call to a definition of a method M' in a class C in the hierarchy $\mathcal{H}$ where class D is a subtype of class C in a behavior in the hierarchy $\mathcal{H}$ for each of an application $A_1$ and an application $A_2$, wherein the method M and the method M' have an identical signature;

associating a name and a set of members with each class in the composed hierarchy $\mathcal{H}_3$;

creating inheritance relations in the composed hierarchy $\mathcal{H}_3$;

testing if two behaviors across the hierarchy $\mathcal{H}_1$ and the hierarchy $\mathcal{H}_3$ are different by comparing a behavior of the application $A_1$ in the composed hierarchy $\mathcal{H}_3$ with a behavior of the application $A_1$ in the hierarchy $\mathcal{H}_1$, and reporting any differences therebetween; and testing if two behaviors across the hierarchy $\mathcal{H}_2$ and the hierarchy $\mathcal{H}_3$ are different by comparing a behavior of the application $A_2$ in the composed hierarchy $\mathcal{H}_3$ with a behavior of the application $A_2$ in the hierarchy $\mathcal{H}_2$, and reporting any differences therebetween.

13. The method of claim 12, further comprising:

determining a behavior $B_1$ of the application $A_1$ in the hierarchy $\mathcal{H}_1$ by associating a method definition $M_1'$ in a class $D_1$ in the hierarchy $\mathcal{H}_1$ with each executed call to a method $M_1$ in class $C_1$ in the hierarchy $\mathcal{H}_1$, wherein the class $D_1$ is a subtype of the class $C_1$ in the hierarchy $\mathcal{H}_1$ and wherein the method $M_1$ and the method $M_1'$ have an identical signature;

determining a behavior $B_2$ of the application $A_2$ in the hierarchy $\mathcal{H}_2$ by associating a method definition $M_2'$ in a class $D_2$ in the hierarchy $\mathcal{H}_2$ with each executed call to a method $M_2$ in class $C_2$ in the hierarchy $\mathcal{H}_2$, wherein the class $D_2$ is a subtype of the $C_2$ in the hierarchy $\mathcal{H}_2$ and wherein the method $M_2$ and the method $M_2'$ have an identical signature;

determining a behavior $B_3$ of the application $A_1$ in the hierarchy $\mathcal{H}_3$ by associating a method definition $M_3'$ in a class $D_3$ in the hierarchy $\mathcal{H}_3$ with each executed call to a method $M_3$ in class $C_3$ in the hierarchy $\mathcal{H}_3$, wherein the class $D_3$ is a subtype of the $C_3$ in the hierarchy $\mathcal{H}_3$, wherein the method $M_3$ and the method $M_3'$ have an identical signature; and determining a behavior $B_4$ of the application $A_2$ in the hierarchy $\mathcal{H}_3$ by associating a method definition $M_4'$ in a class $D_4$ in the hierarchy $\mathcal{H}_3$ with each executed call to a method $M_4$ in a class $C_4$ in the hierarchy $\mathcal{H}_3$, wherein the class $D_4$ is a subtype of the $C_4$ in the hierarchy $\mathcal{H}_3$, wherein the method $M_4$ and the method $M_4'$ have an identical signature.

14. A physical computer readable medium including computer instructions for execution on an information processing device for composing two or more class hierarchies $\mathcal{H}_1$ and $\mathcal{H}_2$ with associated applications $A_1$ and $A_2$ respectively, the computer instructions comprising programming instructions for:

creating a composed hierarchy $\mathcal{H}_3$ by analyzing a hierarchy $\mathcal{H}_1$ and a hierarchy $\mathcal{H}_2$;

creating well-defined methods and/or fields in one or more classes of the hierarchy $\mathcal{H}_3$ by analyzing the hierarchy $\mathcal{H}_1$ and the hierarchy $\mathcal{H}_2$ and user-supplied information;

associating a definition of a method M in a class D in a hierarchy $\mathcal{H}$ with each executed call to a definition of a method M' in a class C in the hierarchy $\mathcal{H}$ where class D is a subtype of class C in a behavior in the hierarchy $\mathcal{H}$ for each of an application $A_1$ and an application $A_2$, wherein the method M and the method M' have an identical signature;

testing if two behaviors across the hierarchy $\mathcal{H}_1$ and the hierarchy $\mathcal{H}_3$ are different by comparing a behavior $B_3$ of the application $A_1$ in the composed hierarchy $\mathcal{H}_3$ with a behavior $B_1$ of the application $A_1$ in the hierarchy $\mathcal{H}_1$ and reporting any differences therebetween; and testing if two behaviors across the hierarchy $\mathcal{H}_2$ and the hierarchy $\mathcal{H}_3$ are different by comparing a behavior $B_4$ of the application $A_2$ in the composed hierarchy $\mathcal{H}_3$ with a behavior $B_2$ of the application $A_2$ in the hierarchy $\mathcal{H}_2$, and reporting any differences therebetween.

15. The computer readable medium of claim 14, further comprising the programming instructions of:

determining a behavior $B_1$ of the application $A_1$ in the hierarchy $\mathcal{H}_1$ by associating a method definition $M_1'$ in a class $D_1$ in the hierarchy $\mathcal{H}_1$ with each executed call to a method $M_1$ in class $C_1$ in the hierarchy $\mathcal{H}_1$, wherein the class $D_1$ is a subtype of the class $C_1$ in the hierarchy $\mathcal{H}_1$ and wherein the method $M_1$ and the method $M_1'$ have an identical signature;

determining a behavior $B_2$ of the application $A_2$ in the hierarchy $\mathcal{H}_1$ by associating a method definition $M_2'$ in a class $D_2$ in the hierarchy $\mathcal{H}_2$ with each executed call to a method $M_2$ in class $C_2$ in the hierarchy $\mathcal{H}_2$, wherein the class $D_2$ is a subtype of the $C_2$ in the hierarchy $\mathcal{H}_2$ and wherein the method $M_2$ and the method $M_2'$ have an identical signature;

determining a behavior $B_3$ of the application $A_1$ in the hierarchy $\mathcal{H}_3$ by associating a method definition $M_3'$ in a class $D_3$ in the hierarchy $\mathcal{H}_3$ with each executed call to a method $M_3$ in class $C_3$ in the hierarchy $\mathcal{H}_3$, wherein the class $D_3$ is a subtype of the $C_3$ in the hierarchy $\mathcal{H}_3$, wherein the method $M_3$ and the method M3' have an identical signature; and determining a behavior $B_4$ of the application $A_2$ in the hierarchy $\mathcal{H}_3$ by associating a method definition $M_4'$ in a class $D_4$ in the hierarchy $\mathcal{H}_3$ with each executed call to a method $M_4$ in class $C_4$ in the hierarchy $\mathcal{H}_3$, wherein the class $D_4$ is a subtype of the $C_4$ in the hierarchy $\mathcal{H}_3$, wherein the method $M_4$ and the method $M_4'$ have an identical signature.

16. The computer readable medium of claim 15, further comprising the programming instructions of:

determining, using program analysis, at least one of the following:

if the behavior of application $A_1$ when executed against the composed hierarchy $\mathcal{H}_3$ differs from the behavior of application $A_1$ when executed against the hierarchy $\mathcal{H}_1$; and if the behavior of application $A_2$ when executed against the composed hierarchy $\mathcal{H}_3$ differs from the behavior of application $A_2$ when executed against the hierarchy $\mathcal{H}_2$.

17. The computer readable medium of claim 15, wherein the programming instruction of creating of the well-defined methods and fields of the composed hierarchy $\mathcal{H}_3$ includes using the user-supplied information to resolve conflicts between methods and/or fields that originate from the hierarchy $\mathcal{H}_1$ and the hierarchy $\mathcal{H}_2$.

18. The computer readable medium of claim 15, further comprising the programming instruction of:
   reporting at least one of the composed hierarchy $\mathcal{H}_1$ and the composed hierarchy $\mathcal{H}_2$ is behavior-preserving in response to zero behavior differences having been reported.

19. The computer readable medium of claim 15, wherein the programming instruction of creating of the well-defined classes in the composed hierarchy $\mathcal{H}_3$ is a basic composition involving the hierarchy $\mathcal{H}_1$ and the hierarchy $\mathcal{H}_2$ and where the hierarchy $\mathcal{H}_1$ and the hierarchy $\mathcal{H}_2$ do not contain static interference.

20. The computer readable medium of claim 15, wherein the programming instruction of creating of the well-defined classes in the composed hierarchy $\mathcal{H}_3$ is an overriding composition involving the hierarchy $\mathcal{H}_1$ and the hierarchy $\mathcal{H}_2$ and where the hierarchy $\mathcal{H}_1$ and the hierarchy $\mathcal{H}_2$ contains static interference.

21. The computer readable medium of claim 20, wherein the programming instruction of creating of the well-defined classes in the composed hierarchy $\mathcal{H}_3$ is an overriding composition involving the hierarchy $\mathcal{H}_1$ and the hierarchy $\mathcal{H}_3$ and where the determining, using program analysis, includes precedence of members as part of the user-supplied information and where the hierarchy $\mathcal{H}_1$ and the hierarchy $\mathcal{H}_2$ contains static interference.

22. The computer readable medium of claim 21, wherein the programming instruction of determining, using program analysis, includes determining if the composition of the hierarchy $\mathcal{H}_1$ and the hierarchy $\mathcal{H}_2$ contains dynamic interference.

23. The computer readable medium of claim 21, wherein the programming instruction of determining, using program analysis, includes using impact analysis to determine any parts of the application $A_1$ and/or any parts of the application $A_2$ whose behavior have changed.

24. The computer readable medium of claim 22, wherein the programming instruction of using program analysis, includes using impact analysis to determine any parts of the application $A_1$ and/or parts of the application $A_2$ whose behavior have changed.

25. A physical computer readable medium including computer instructions for execution on an information processing device for composing two or more class hierarchies $\mathcal{H}_1$ and $\mathcal{H}_2$ with associated applications $A_1$ and $A_2$ respectively, the computer instructions comprising instructions for:
   determining a union of any inheritance relations in two or more input class hierarchies $\mathcal{H}_1$ and $\mathcal{H}_2$;
   determining one or more cycles in a transitive closure of the inheritance relations, and constructing a set of equivalence classes $\epsilon$ corresponding to the cycles;
   associating a name and a set of members with each class;
   creating inheritance relations in the composed hierarchy $\mathcal{H}_3$;
   associating a definition of a method M in a class D in a hierarchy $\mathcal{H}$ with each executed call to a definition of a method M' in a class C in the hierarchy $\mathcal{H}$ where class D is a subtype of class C in a behavior in the hierarchy $\mathcal{H}$ for each of an application $A_1$ and an application $A_2$, wherein the method M and the method M' have an identical signature;
   creating of a class in a composed hierarchy $\mathcal{H}_3$ for each equivalence class in $\epsilon$; testing if two behaviors across the hierarchy $\mathcal{H}_1$ and the hierarchy $\mathcal{H}_3$ are different by comparing a behavior $B_3$ of the application $A_1$ in the composed hierarchy $\mathcal{H}_3$ with a behavior $B_1$ of the application $A_1$ in the hierarchy $\mathcal{H}_1$ and reporting any differences therebetween; and
   testing if two behaviors across the hierarchy $\mathcal{H}_3$ and the hierarchy $\mathcal{H}_3$ are different by comparing a behavior $b_4$ of the application $A_2$ in the composed hierarchy $\mathcal{H}_3$ with a behavior $B_2$ of the application $A_2$ in the hierarchy $\mathcal{H}_2$, and reporting any differences therebetween.

26. The computer readable medium of claim 25, further comprising the programming instructions of:
   determining a behavior $B_1$ of the application $A_1$ in the hierarchy $\mathcal{H}_1$ by associating a method definition $M_1'$ in a class $D_1$ in the hierarchy $\mathcal{H}_1$ with each executed call to a method $M_1$ in class $C_1$ in the hierarchy $\mathcal{H}_1$, wherein the class $D_1$ is a subtype of the class $C_1$ in the hierarchy $\mathcal{H}_1$ and wherein the method $M_1$ and the method $M_1'$ have an identical signature;
   determining a behavior $B_2$ of the application $A_2$ in the hierarchy $\mathcal{H}_2$ by associating a method definition $M_2'$ in a class $D_2$ in the hierarchy $\mathcal{H}_2$ with each executed call to a method $M_2$ in class $C_2$ in the hierarchy $\mathcal{H}_2$, wherein the class $D_2$ is a subtype of the $C_2$ in the hierarchy $\mathcal{H}_2$ and wherein the method $M_2$ and the method $M_2'$ have an identical signature;
   determining a behavior $B_3$ of the application $A_1$ in the hierarchy $\mathcal{H}_3$ by associating a method definition $M_3'$ in a class $D_3$ in the hierarchy $\mathcal{H}_3$ with each executed call to a method $M_3$ in class $C_3$ in the hierarchy $\mathcal{H}_3$, wherein the class $D_3$ is a subtype of the $C_3$ in the hierarchy $\mathcal{H}_3$, wherein the method $M_3$ and the method $M_3'$ have an identical signature; and
   determining a behavior $B_4$ of the application $A_2$ in the hierarchy $\mathcal{H}_3$ by associating a method definition $M_4'$ in a class $D_4$ in the hierarchy $\mathcal{H}_3$ with each executed call to a method $M_4$ in class $C_4$ in the hierarchy $\mathcal{H}_3$, wherein the class $D_4$ is a subtype of the $C_4$ in the hierarchy $\mathcal{H}_3$, wherein the method $M_4$ and the method $M_4'$ have an identical signature.

27. A computer system for composing two or more class hierarchies $\mathcal{H}_1$ and $\mathcal{H}_2$ with associated applications $A_1$ and $A_2$ respectively, the computer system comprising:
   a processor coupled to memory for executing a software program to perform: means for creating a composed hierarchy $\mathcal{H}_3$ by analyzing a hierarchy $\mathcal{H}_1$ and a hierarchy $\mathcal{H}_2$;
   means for creating well-defined methods and/or fields created in one or more classes of the hierarchy $\mathcal{H}_3$ by analyzing the hierarchy $\mathcal{H}_1$ and the hierarchy $\mathcal{H}_2$ and user-supplied information;
   means for associating a definition of a method M in a class D in a hierarchy $\mathcal{H}$ with each executed call to a definition of a method M' in a class C in the hierarchy $\mathcal{H}$ where class D is a subtype of class C in a behavior in the hierarchy $\mathcal{H}$ for each of an application $A_1$ and an application $A_2$, wherein the method M and the method M' have an identical signature;

means for testing if two behaviors across the hierarchy $\mathcal{H}_1$ and the hierarchy $\mathcal{H}_3$ are different by comparing a behavior $B_3$ of the application $A_1$ in the composed hierarchy $\mathcal{H}_3$ with a behavior $B_1$ of the application $A_1$ in the hierarchy $\mathcal{H}_1$ and reporting any differences therebetween; and means for testing if two behaviors across the hierarchy $\mathcal{H}_2$ and the hierarchy $\mathcal{H}_3$ are different by comparing a behavior $B_4$ of the application $A_2$ in the composed hierarchy $\mathcal{H}_3$ with a behavior $B_2$ of the application $A_2$ in the hierarchy $\mathcal{H}_2$, and reporting any differences therebetween.

28. The computer system of claim 27, further comprising:

determining a behavior $B_1$ of the application $A_1$ in the hierarchy $\mathcal{H}_1$ by associating a method definition $M_1'$ in a class $D_1$ in the hierarchy $\mathcal{H}_1$ with each executed call to a method $M_1$ in class $C_1$ in the hierarchy $\mathcal{H}_1$, wherein the class $D_1$ is a subtype of the class $C_1$ in the hierarchy $\mathcal{H}_1$ and wherein the method $M_1$ and the method $M_1'$ have an identical signature;

determining a behavior $B_2$ of the application $A_2$ in the hierarchy $\mathcal{H}_2$ by associating a method definition $M_2'$ in a class $D_2$ in the hierarchy $\mathcal{H}_2$ with each executed call to a method $M_2$ in class $C_2$ in the hierarchy $\mathcal{H}_2$, wherein the class $D_2$ is a subtype of the $C_2$ in the hierarchy $\mathcal{H}_2$ and wherein method $M_2$ and the method $M_2'$ have an identical signature;

determining a behavior $B_3$ of the application $A_1$ in the hierarchy $\mathcal{H}_3$ by associating a method definition $M_3'$ in a class $D_3$ in the hierarchy $\mathcal{H}_3$ with each executed call to a method $M_3$ in class $C_3$ in the hierarchy $\mathcal{H}_3$, wherein the class $D_3$ is a subtype of the $C_3$ in the hierarchy $\mathcal{H}_3$, wherein the method $M_3$ and the method $M_3'$ have an identical signature; and determining a behavior $B_4$ of the application $A_2$ in the hierarchy $\mathcal{H}_3$ by associating a method definition $M_4'$ in a class $D_4$ in the hierarchy $\mathcal{H}_3$ with each executed call to a method $M_4$ in class $C_4$ in the hierarchy $\mathcal{H}_3$, wherein the class $D_4$ is a subtype of the $C_4$ in the hierarchy $\mathcal{H}_3$, wherein the method $M_4$ and the method $M_4'$ have an identical signature.

29. The computer system of claim 28, further comprising:

means for determining, using program analysis, at least one of the following:

if the behavior of application $A_1$ when executed against the composed hierarchy $\mathcal{H}_3$ differs from the behavior of application $A_1$ when executed against the hierarchy $\mathcal{H}_1$; and if the behavior of application $A_2$ when executed against the composed hierarchy $\mathcal{H}_3$ differs from the behavior of application $A_2$ when executed against the hierarchy $\mathcal{H}_2$.

* * * * *